(12) United States Patent
Kanda et al.

(10) Patent No.: US 12,073,134 B2
(45) Date of Patent: Aug. 27, 2024

(54) INFORMATION PROCESSING DEVICE CREATING COMPOSITE LABEL BASED ON FIRST LABEL DATA AND SECOND LABEL DATA WHICH IS GENERATED BY USING THE FIRST LABEL DATA

(71) Applicant: BROTHER KOGYO KABUSHIKI KAISHA, Nagoya (JP)

(72) Inventors: Ryuichi Kanda, Nagoya (JP); Tomoyasu Fukui, Inuyama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/173,023

(22) Filed: Feb. 22, 2023

(65) Prior Publication Data

US 2023/0305773 A1 Sep. 28, 2023

(30) Foreign Application Priority Data

Mar. 22, 2022 (JP) .................................. 2022-046146

(51) Int. Cl.
*G06F 3/12* (2006.01)
*B41J 3/407* (2006.01)

(52) U.S. Cl.
CPC .......... *G06F 3/1243* (2013.01); *B41J 3/4075* (2013.01); *G06F 3/1208* (2013.01)

(58) Field of Classification Search
CPC ...... G06F 3/1243; G06F 3/1208; B41J 3/4075
See application file for complete search history.

(56) References Cited

U.S. PATENT DOCUMENTS

| | | | | |
|---|---|---|---|---|
| 5,805,783 | A * | 9/1998 | Ellson | G06T 15/20 345/468 |
| 11,413,879 | B2 * | 8/2022 | Yuasa | B41J 3/4075 |
| 2019/0299656 | A1 * | 10/2019 | Kako | B41J 3/46 |
| 2020/0406633 | A1 * | 12/2020 | Yuasa | G06F 3/1232 |
| 2021/0229465 | A1 * | 7/2021 | Miyajima | G06F 3/121 |
| 2022/0032652 | A1 * | 2/2022 | Kanda | B41J 3/4075 |
| 2022/0084289 | A1 * | 3/2022 | Casaburo | G06T 19/006 |
| 2022/0261195 | A1 * | 8/2022 | Fukui | G06F 3/1208 |

FOREIGN PATENT DOCUMENTS

JP 2010-17937 A 1/2010

OTHER PUBLICATIONS

English Machine Translated Document of JP-2009066836 A, (Nakajima, Published Apr. 2, 2009) (Year: 2009).*

* cited by examiner

*Primary Examiner* — Juan M Guillermety
(74) *Attorney, Agent, or Firm* — KENEALY VAIDYA LLP

(57) ABSTRACT

In an information processing device, a computer prepares first label data including first object data. The first label data and the first object data represent respectively a first image and a first object. The first label data is to be used to create a first label. The computer generates second label data including second object data by using the first label data. The second object data is generated by using the first object data. The second label data and the second object data represent respectively a second image and a second object. The second label data is to be used to create a second label. The first label and the second label are to be overlaid to create a composite label. A region of the first object and a region of the second object are partially overlapped when the first and second labels are to be overlaid.

38 Claims, 15 Drawing Sheets

INFORMATION PROCESSING DEVICE CREATING COMPOSITE LABEL BASED ON FIRST LABEL DATA AND SECOND LABEL DATA WHICH IS GENERATED BY USING THE FIRST LABEL DATA

REFERENCE TO RELATED APPLICATIONS

This application claims priority from Japanese Patent Application No. 2022-046146 filed on Mar. 22, 2022. The entire content of the priority application is incorporated herein by reference.

BACKGROUND ART

Conventionally, a user created a label with a desired appearance by printing images on a plurality of tapes using a tape printing device and then overlaying the printed tapes in their thickness direction, for example.

DESCRIPTION

Overlaying multiple tapes one on another in their thickness direction, as in the conventional technology described above, not only is a simple way to increase the number of colors making up the labels, but also can produce a label with an appearance that could not be expressed using a single label.

In view of the foregoing, it is an object of the present disclosure to provide a technology that can simplify the creation of labels having a three-dimensional appearance.

In order to attain the above and other object, the present disclosure provides a non-transitory computer readable storage medium storing a set of program instructions executed by a computer included in an information processing device. The set of program instructions includes: preparing first label data including first object data, the first label data representing a first image, the first object data representing a first object in the first image, the first label data being to be used to create a first label by printing the first image on a first medium; and generating second label data including second object data by using the first label data, the second object data being generated by using the first object data, the second label data representing a second image and the second object data representing a second object in the second image, the second label data being to be used to create a second label by printing the second image on a second medium, the first label and the second label being to be overlaid one on another to create a composite label, and a region of the first object to be printed on the first medium and a region of the second object to be printed on the second medium being partially overlapped with each other when the first label and the second label are to be overlaid one on another.

According to another aspect, the disclosure provides a non-transitory computer readable storage medium storing a set of program instructions executed by a computer included in an information processing device. The set of program instructions includes: preparing first label data including first object data, the first label data representing a first image and the first object data representing a first object in the first image, the first label data being to be used to create a first label by printing the first image on a first medium; and generating second label data including second object data by using the first label data, the second object data being generated by using the first object data, the second label data representing a second image and the second object data representing a second object in the second image, the second label data being to be used to create a second label by printing the second image on a second medium, the first label and the second label being to be overlaid one on another to create a composite label representing a composite image in which the first image and the second image are overlapped with each other, and in the composite image, a region of the second object being a region of a virtual object excluding the region of the first object, in the composite image the virtual object being obtained by shifting the first object a prescribed distance to be partially overlapped with the first object.

According to another aspect, the disclosure provides an information processing device. The information processing device includes a computer configured to perform: preparing first label data including first object data, the first label data representing a first image, the first object data representing a first object in the first image, the first label data being to be used to create a first label by printing the first image on a first medium; and generating second label data including second object data by using the first label data, the second object data being generated by using the first object data, the second label data representing a second image and the second object data representing a second object in the second image, the second label data being to be used to create a second label by printing the second image on a second medium, the first label and the second label being to be overlaid one on another to create a composite label, and a region of the first object to be printed on the first medium and a region of the second object to be printed on the second medium being partially overlapped with each other when the first label and the second label are to be overlaid one on another.

According to another aspect, the disclosure provides an information processing device. The information processing device includes a computer configured to perform: preparing first label data including first object data, the first label data representing a first image and the first object data representing a first object in the first image, the first label data being to be used to create a first label by printing the first image on a first medium; and generating second label data including second object data by using the first label data, the second object data being generated by using the first object data, the second label data representing a second image and the second object data representing a second object in the second image, the second label data being to be used to create a second label by printing the second image on a second medium, the first label and the second label being to be overlaid one on another to create a composite label representing a composite image in which the first image and the second image are overlapped with each other, and in the composite image, a region of the second object being a region of a virtual object excluding the region of the first object, in the composite image the virtual object being obtained by shifting the first object a prescribed distance to be partially overlapped with the first object.

With the above structures, the label having the three-dimensional appearance can be easily made.

FIRST EMBODIMENT

A first embodiment of the present disclosure will be described below. The first embodiment describes a case in which data of a second object for a second label is generated on an information terminal when the user selects a first object for a first label.

Overall Configuration of the System

Figure 1:
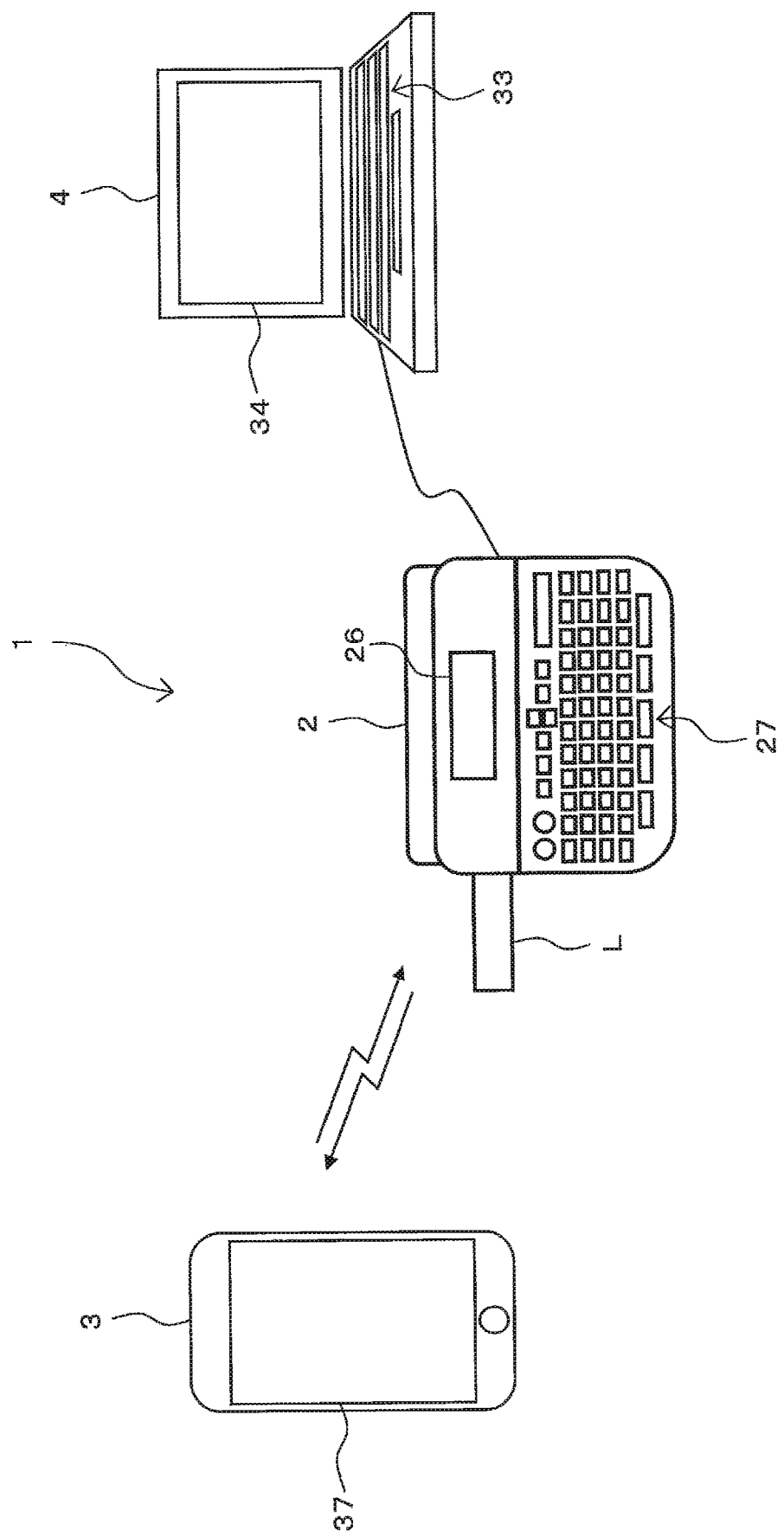
FIG. 1 is an explanatory diagram illustrating an entire configuration of a printing system.

FIG. 1 shows an example of the overall configuration of a printing system 1 according to the first embodiment. In FIG. 1, the printing system 1 has a label creating device 2, and information terminals 3 and 4. The printing system 1 may include either one or both of the information terminals 3 and 4. The label creating device 2 is a label printer that creates print labels L, for example. The label creating device 2 has a display 26, and an input interface (user interface, or operating interface) 27. The information terminal 3 is a portable terminal, for example. The information terminal 3 may be a smartphone having a touchscreen 37, as depicted in FIG. 1; a tablet computer; or the like. The information terminal 4 is a common personal computer, for example, such as a laptop computer provided with an operating interface (input interface, or user interface) 33 and a display 34, as depicted in FIG. 1, or a desktop computer. The information terminals 3 and 4 are both connected to and capable of exchanging information with the label creating device 2. As an example, the information terminal 3 is connected to the label creating device 2 through a wireless connection while the information terminal 4 is connected to the label creating device 2 through a wired connection. Conversely, the information terminal 3 may be connected through a wired connection and the information terminal 4 through a wireless connection.

Information Terminals

Figure 2:
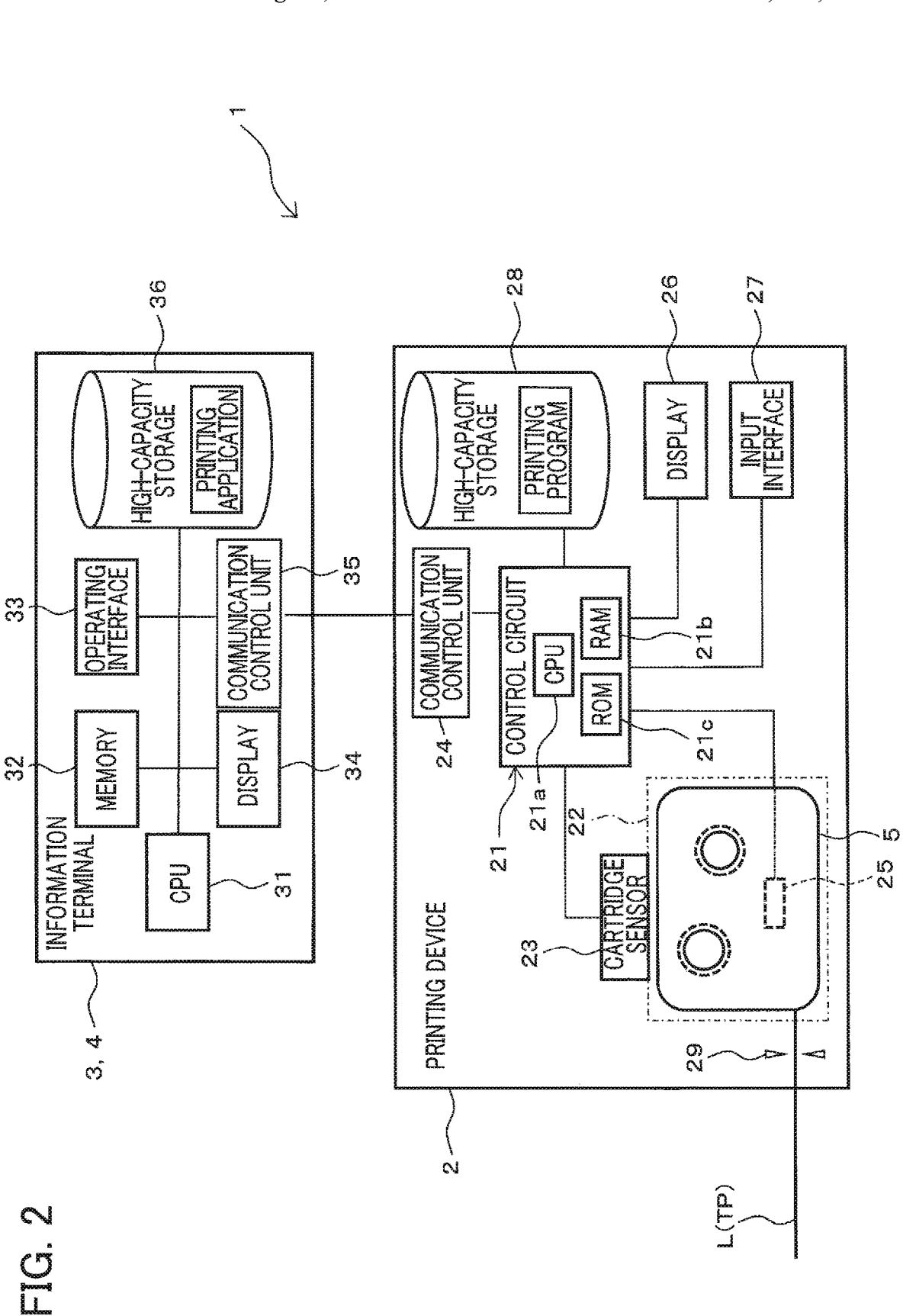
FIG. 2 is a block diagram illustrating hardware configurations of information terminals and a printing device.

FIG. 2 shows an example of the hardware configuration in the information terminals 3 and 4. As shown in FIG. 2, each of the information terminals 3 and 4 is provided with a CPU 31, a memory 32 that includes RAM and ROM, for example, the operating interface 33, the display 34, a communication control unit 35, and a high-capacity storage 36. The information terminals 3 and 4 are both an example of the information processing device and an example of the external device. The CPU 31 in each of the information terminals 3 and 4 is an example of the controller, the computer, and the processor.

The operating interface 33 receives instructions and information inputted by a user. The display 34 displays various information and messages. The functions of the operating interface 33 and the functions of the display 34 are combined to configure the touchscreen 37 in the information terminal 3. The operating interface 33 may include a keyboard and a mouse in the information terminal 4. The communication control unit 35 controls communications with the label creating device 2. The communication control unit 35 includes a network interface (communication interface).

The high-capacity storage 36 stores a printing application for instructing the CPU 31 to perform various steps in the sequences shown in FIGS. 9-11, and 14 described later, including the editing of print data; various other programs; various data; and the like. The printing application, various programs, various data, and the like may be stored in the memory 32 instead.

The CPU 31 performs various processes and conducts communications with the label creating device 2 according to programs stored in ROM or in the high-capacity storage 36, while utilizing RAM in the memory 32 for temporary storage. The CPU 31 is an example of the computer, an example of the controller, and an example of the processor.

Printing Device

FIG. 2 shows an example of the hardware configuration in the label creating device 2. As shown in FIG. 2, the label creating device 2 has a control circuit 21, a cartridge holder 22, a cartridge sensor 23, a communication control unit 24, a print head 25, the display 26, the input interface 27, and a high-capacity storage 28. The print head 25 is an example of the print engine, and an example of the print mechanism.

A cartridge 5 is detachably mounted in the cartridge holder 22. The cartridge sensor 23 is disposed in the cartridge holder 22 for detecting the type of cartridge 5 mounted in the cartridge holder 22 according to a suitable known method, such as mechanical, optical, or magnetic detection.

The control circuit 21 includes a CPU 21a, a RAM 21b, and a ROM 21c. The label creating device 2 is connected to the communication control unit 35 in each of the information terminals 3 and 4 via the communication control unit 24 so as to be capable of exchanging information with the information terminals 3 and 4. The CPU 21a is an example of the controller, an example of the processor, and an example of the computer.

The input interface 27 is configured of a plurality of buttons and the like through which a user inputs instructions and information. The display 26 is a liquid crystal display, for example, for displaying various information and messages. The communication control unit 24 controls communications with the information terminals 3 and 4. The communication control unit 24 includes a network interface (communication interface).

The high-capacity storage device 28 stores a printing program, various data, and the like for instructing the CPU 21a to implement steps in the sequences shown in FIG. 15 and the like described later. Alternatively, the printing program, various data, and the like may be stored in the RAM 21b or ROM 21c of the control circuit 21.

As shown in FIG. 2, the label creating device 2 is also provided with a cutter 29. After a label tape TP is printed by the print head 25, the label tape TP is cut by the cutter 29 to create a print label L.

Composite Label

Figure 3:
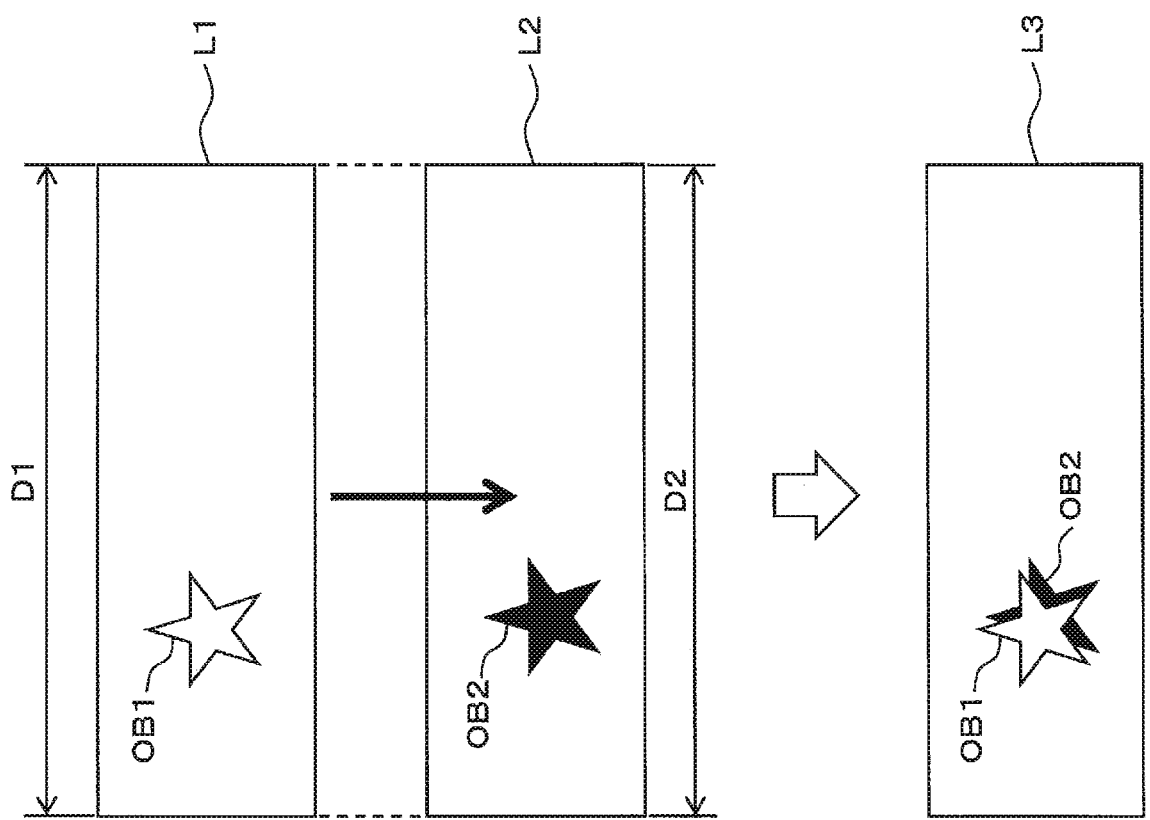
FIG. 3 is an explanatory diagram illustrating an example to create a composite label in which first and second objects based on first object data and second object data respectively have the same shape and the second object is located at a position shifted from that of the first object.
Figure 4:
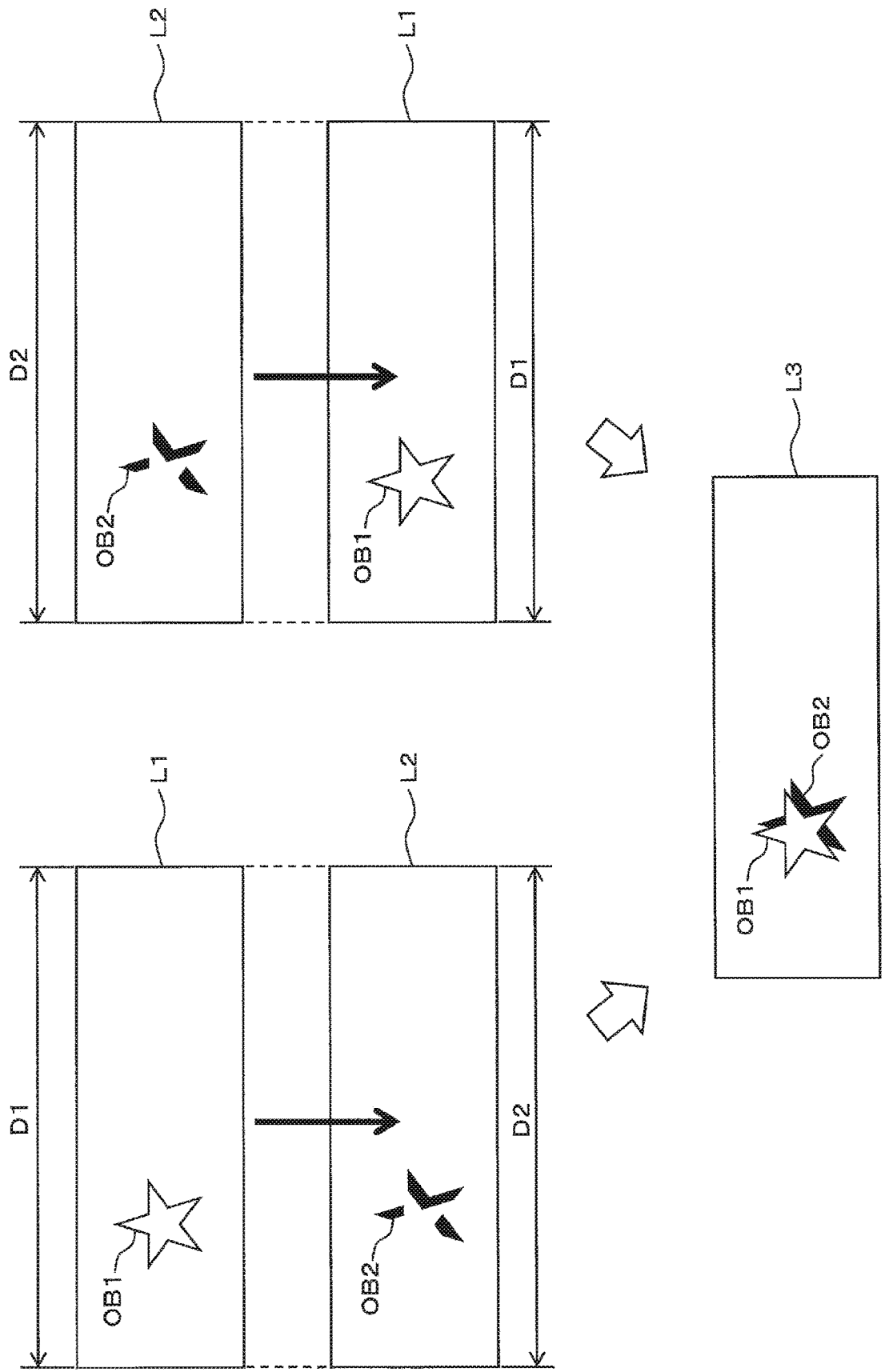
FIG. 4 is an explanatory diagram illustrating an example to create a composite label in which second object based on second object data is located at a position shifted from that of first object based on first object data and the second object has a shape having an area of difference between the first object and a shifted object.

As shown in FIGS. 3 and 4, in the present embodiment the user creates a first label L1 by printing an image based on first label data on a label tape TP, creates a second label L2 by printing an image based on second label data on a label tape TP, and creates a composite label L3 by overlaying and bonding the first label L1 and second label L2 together in their thickness direction. The first label data includes first object data for forming a first object OB1 on the first label L1. The second label data includes second object data for forming a second object OB2 on the second label L2. The label tape TP for creating the first label L1 is an example of a first medium. The label tape TP for creating the second label L2 is an example of a second medium.

The color of the second object data differs from the color of the first object data. For example, the color for the second object data is preset to an achromatic color, such as black or gray, and is stored in the memory 32. The present embodiment describes a case in which the first object OB1 is a star-shaped figure in a chromatic color such as red, blue, or yellow, and the second object OB2 is a star-shaped figure having the same shape as the first object OB1 and is black, for example.

FIG. 3 shows an example of creating a composite label L3. In this example, the first label L1 and the second label L2 are the same size, and the composite label L3 is to be created by bonding the labels L1 and L2 together with their respective corners in alignment. In the example of FIG. 3, the first label L1 is formed of a transparent base tape on which the first object OB1 has been printed in a chromatic printing color (e.g., yellow). The second label L2 is configured of a chromatic (e.g., blue) base tape on which the second object OB2 has been printed in an achromatic color (e.g., black). The second object OB2 based on the second object data and the first object OB1 based on the first object data have the same size and shape. The layout position of the second object OB2 on the second label L2 is offset rightward in the drawing from the layout position of the first object OB1 on the first label L1. The second object OB2 formed according to the second object data occupies a second occupied area (region) on the second label L2, and the first object OB1 formed according to the first object data occupies a first occupied area (region) on the first label L1. As shown in FIG. 3, some parts of the second occupied area and first occupied area overlap while other parts do not. This allows the second object OB2 to function as a shadow of the first object OB1, for example, giving the resulting composite label L3 a three-dimensional effect.

In the example shown in FIG. 3, the first label L1 is bonded to the top of the second label L2 to create the composite label L3. In other words, the first label L1 forms the top layer in the composite label L3 and the second label L2 forms the bottom layer. Areas of the first label L1 other than the first occupied area occupied by the first object OB1 are transparent so that the second label L2 can be seen through the first label L1. The second label data is generated so that the first area of the first object OB1 printed on a first print medium and the second area of the second object OB2 printed on a second medium are partially overlapped with each other when the first label L1 and the second label L2 are overlaid on each other.

FIG. 4 shows an example of creating a composite label L3 when the shape of the second object OB2 is formed at a position shifted (offset) from the first object OB1 and having a shape (region) obtained by subtracting the shape (region) of the shifted first object OB1. That is, the position of the first object of the first object data is shifted a prescribed amount to form new virtual object, and the second object data is generated to represent the area of this new virtual object (shifted object) that differs from the area of the original object (first object) prior to being shifted. In other words, the area (region) of the second object is an area (region) obtained by excluding the area (region) of the first object from the area (region) of the shifted virtual object. The method shown in FIG. 4 is used to create a composite label L3 when the first object OB1 on the first label L1 is formed of a highly transparent color through which the second object OB2 would be visible if the first label L1 and second label L2 were printed with a first object OB1 and second object OB2 of the same shape, or when the second label L2 is set as the top layer due to such circumstances as there being no cartridge 5 having a transparent base label with the correct printing color for the first object OB1, for example. In all of the above cases, the second object OB2 can still function as a shadow of the first object OB1, for example, enabling the composite label L3 to be created with a three-dimensional effect.

In the examples shown in FIG. 4, the composite label L3 may be created by bonding the first label L1 to the top of the second label L2 or by bonding the second label L2 to the top of the first label L1. In the former case, the first label L1 constitutes the top layer of the composite label L3, and the second label L2 constitutes the bottom layer. Areas of the first label L1 other than the first occupied area occupied by the first object OB1 are transparent so that the second label L2 is visible through the first label L1. In the latter case, the second label L2 constitutes the top layer of the composite label L3 and the first label L1 constitutes the bottom layer. Areas of the second label L2 other than the second occupied area occupied by the second object OB2 are transparent so that the first label L1 is visible through the second label L2. The second label data is generated so that in an image represented by the composite label, an area of the second object OB2 is a partial area of an area occupied by a virtual object except the area of the first object is an area occupied by a virtual object and excludes the area of the first object. Here, the virtual object is obtained by shifting the first object a prescribed distance (offset). That is, the area of the second object OB2 is the area occupied by the virtual object excluding (except) the area of the first object.

As shown in FIGS. 3 and 4, the first label L1 has a length D1 that is the dimension of the first label in the longitudinal direction and is defined by the first label data, and the second label L2 has a length D2 that is the dimension of the second label in the longitudinal direction and is defined by the second label data. Here, the length D1 of the first label L1 and the length D2 of the second label L2 are equivalent.

This embodiment describes examples in which two labels L1 and L2 are overlaid on each other. However, the number of print labels L to be overlaid on each other is not limited to two but may be three or more.

Label Editing Screen

Figure 5:
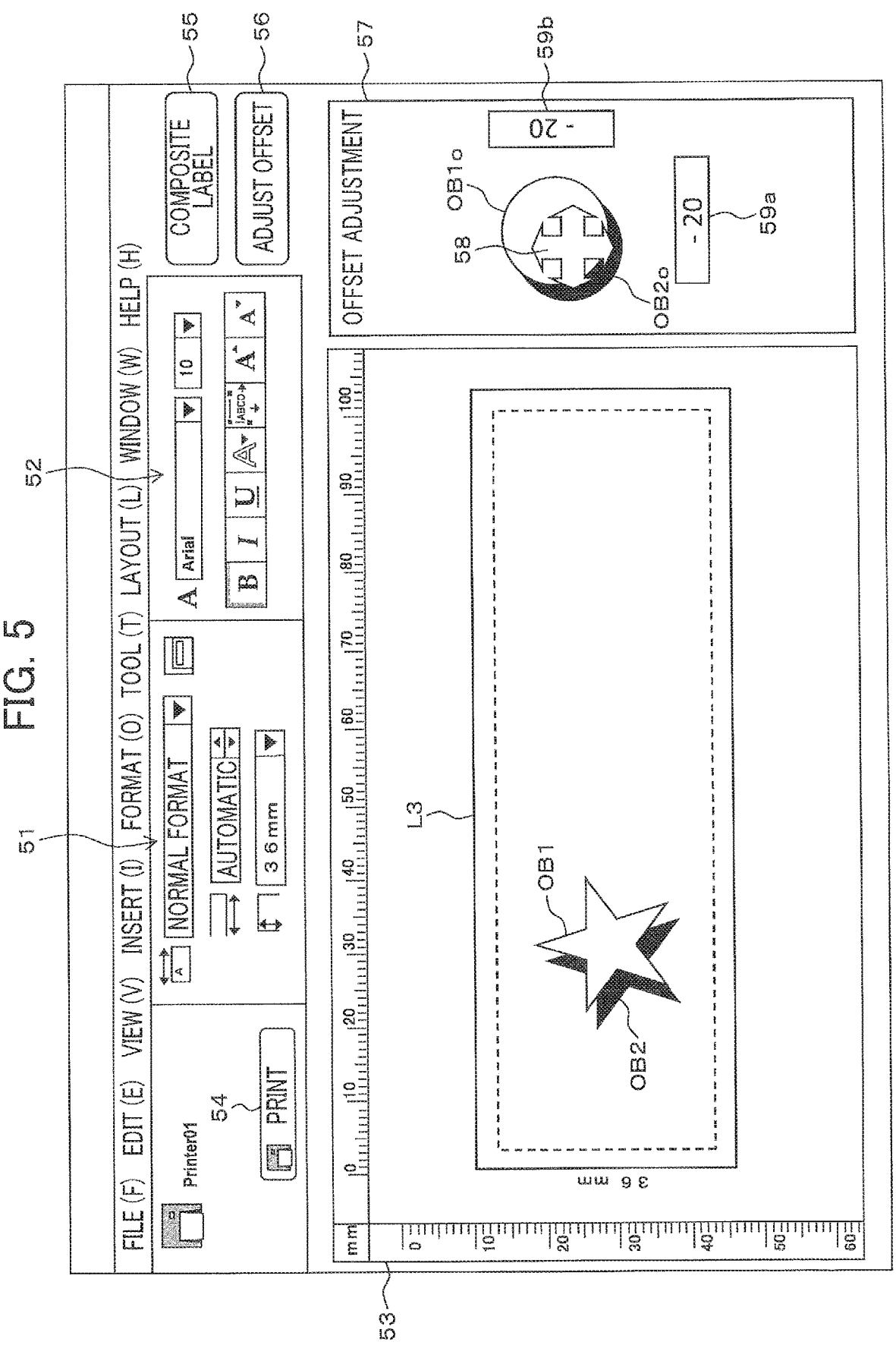
FIG. 5 is an explanatory diagram illustrating an example of a label editing screen displayed on a touchscreen of the information terminal and a display of the information terminal.

FIG. 5 shows an example of a label editing screen displayed on the touchscreen 37 of the information terminal 3 or the display 34 of the information terminal 4. As shown in FIG. 5, the label editing screen includes a format selection section 51, a font selection section 52, an image display area 53, a Print button 54, a Composite Label button 55, an Adjust Offset button 56, and an object editing display area 57, for example. The content displayed in the object editing display area 57 may differ in a manner depending on what operations were performed prior to that point. An object selection screen is initially displayed in the object editing display area 57 when the printing application is started. The object selection screen includes a plurality of objects that the user can select through selection operations as objects to be formed on print labels. The offset adjustment screen shown in FIG. 5 is displayed in the object editing display area 57 in place of the object selection screen when the user operates the Adjust Offset button 56.

The format selection section 51 enables the user to set a format for the label to be created, the length and width of the label, and the like. The font selection section 52 enables the user to set the font, size, and the like of text to be printed on the label, for example. An image of the label currently being edited by the user is displayed in the image display area 53. In the example of FIG. 5, a composite label L3 having a label width of 36 mm is displayed in the image display area 53.

The Print button 54 is a button to be operated by the user to issue a print command. When the Print button 54 is operated, print data is transmitted from the information terminal 3 or 4 to the label creating device 2.

The Composite Label button 55 is a button to be operated by the user to issue an instruction to execute a process for generating label data. When the Composite Label button 55 is operated, the CPU 31 of the information terminal 3 or 4 executes a label data generation process to generate second label data that includes the second object data based on the first object data included in the first label data. In the example shown in FIG. 5, in a case that the user operates the Composite Label button 55 while a label having the first object OB1 formed according to the first object data is displayed in the image display area 53, the CPU 31 uses the first object data to generate second object data, and displays a label formed by adding a second object OB2 based on this second object data to the image thereof. The term "use" here includes the meaning of "duplicate." The expression "duplicate an object" indicates to generate an object from an original (object) so that the generated object has properties such as a shape, size, and patterns basically the same as those of the original except some properties. However, the second object data may be generated through a method other than duplication, provided that the second object OB2 has the same shape as the first object OB1. The signal generated by the operation of the Composite Label button 55 and acquired by the CPU 31 is an example of the prescribed operation information.

The first image displayed according to the first label data that includes the first object data and the second image displayed according to the second label data that includes the second object data are overlapped (arranged in layers) when displayed in the image display area 53. In other words, the image display area 53 displays an image of a composite label L3 created by bonding the first label L1 and second label L2 together in their thickness direction.

The user operates the Adjust Offset button 56 in order to adjust the offset for the second object OB2. "Offset" in the present embodiment includes both the direction and distance (amount) of offset. When the Adjust Offset button 56 is operated, the offset adjustment screen is displayed in the object editing display area 57. The offset adjustment screen includes a first reference object OB1o, a second reference object OB2o, a position adjuster 58, and offset entry fields 59a and 59b. The position of the second reference object OB2o relative to the first reference object OB1o corresponds to the position of the second object OB2 relative to the first object OB1.

By moving the position adjuster 58 up, down, left, and right through prescribed operations, such as dragging, the user can move the second reference object OB2o upward, downward, leftward, and rightward by desired amounts, thereby adjusting the distance and direction of offset between the second object OB2 and first object OB1. In this example, the second object OB2 moves in accordance with the movement of the second reference object OB2o to adjust the offset between the first object OB1 and the second object OB2 The user can also move the second reference object OB2o upward, downward, leftward, and rightward desired distances by inputting an offset value in the offset entry field 59a for offset in the longitudinal direction of the label and by inputting an offset value in the offset entry field 59b for offset in the widthwise direction (transverse direction) of the label, thereby adjusting the distance and direction of offset between the second object OB2 and the first object OB1.

Transition of Screens in the Image Display Area

Figure 6:
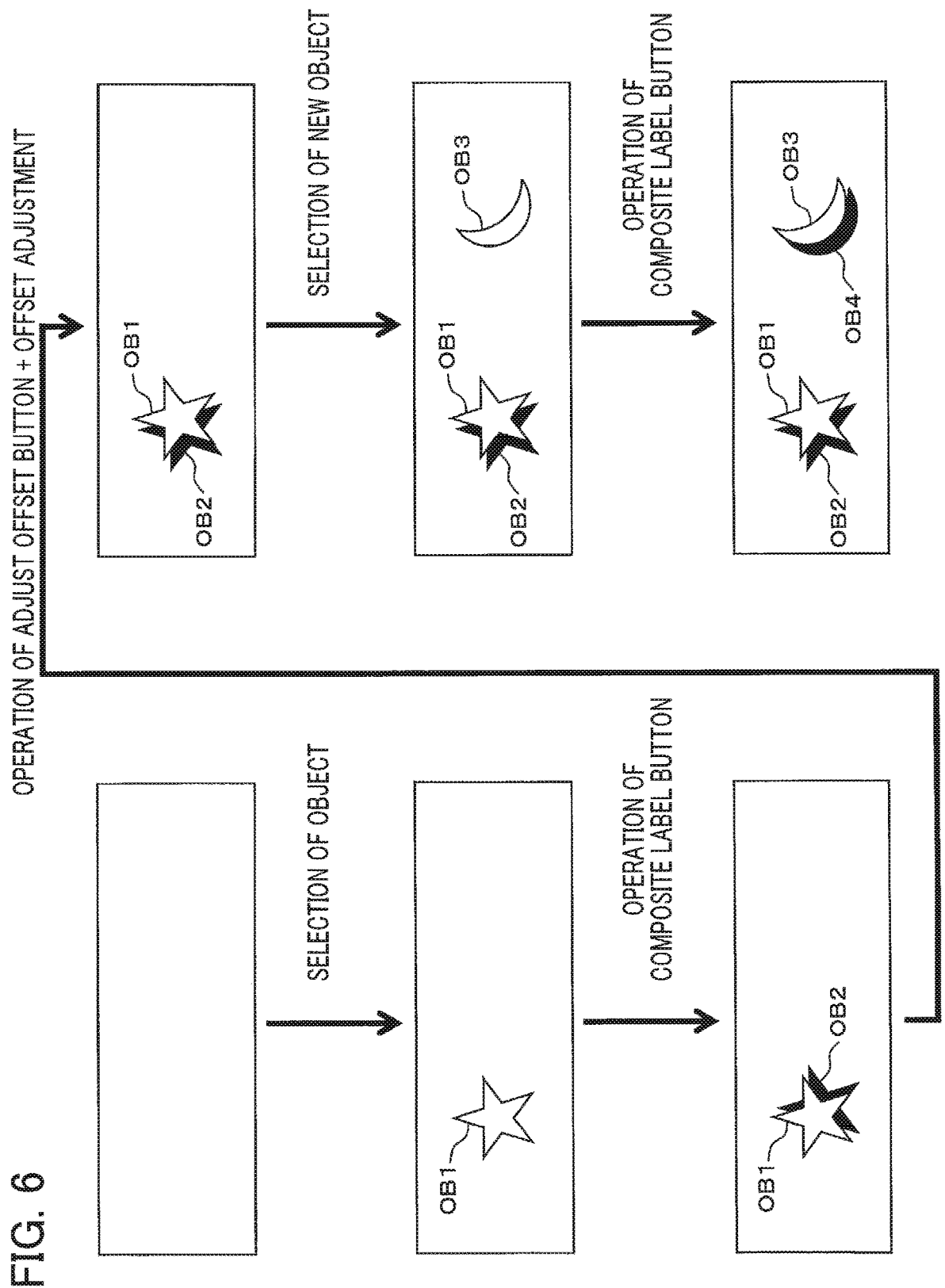
FIG. 6 is an explanatory diagram illustrating an example of screen transitions in an image display area.

FIG. 6 shows a sample transition of screens displayed in the image display area 53. As shown in FIG. 6, in the initial state of the image display area 53 while the user has not yet selected an object, a white label is displayed. When the user subsequently selects a desired first object OB1, an image of a label on which the first object OB1 is formed is displayed in the image display area 53. Through suitable operations, the user can adjust the position of the first object OB1 on the label. In a case that the user subsequently operates the Composite Label button 55 while the first object OB1 is selected, a second object OB2 corresponding to the first object OB1 is added to the label displayed on the image display area 53. The second object OB2 is displaced from the first object OB1 by an initial offset. This initial offset is preset so that the second object OB2 is shifted upstream in the conveying direction from the first object OB1 by a distance that leaves the two objects partially overlapped, for example, and is stored in the memory 32, for example. Here, the conveying direction is a leftward direction in FIG. 5, and the second object OB2 is initially shifted rightward from the first object OB1.

Next, the user can operate the Adjust Offset button 56 to perform an adjustment of the direction and distance of offset for the second object OB2 in the offset adjustment screen. When the user adjusts the offset, the second object OB2 displayed in the image display area 53 is moved in accordance with the user input. In the example shown in FIG. 6, the offset has been adjusted to move the second object OB2 downstream in the conveying direction relative to the first object OB1. When no more objects are added, the process ends here. The following is an example in which another object is added.

When the user selects a new third object, a third object OB3 is added to the image of the label displayed in the image display area 53. The user can adjust the position of the third object OB3 on the label through suitable operations. When the user subsequently operates the Composite Label button 55 while the third object OB3 is selected, a fourth object OB4 corresponding to the third object OB3 is added to the image of the label displayed in the image display area 53. The fourth object OB4 is displaced from the third object OB3 by the adjusted offset for the second object OB2 relative to the first object OB1. In other words, the offset between the second object OB2 and the first object OB1 is the same as the offset between the fourth object OB4 and the third object OB3. The user may also operate the Adjust Offset button 56 to adjust the offset for the fourth object OB4 in the offset adjustment screen when the user wishes to set different offsets for the fourth object OB4 and second object OB2.

Figure 7:
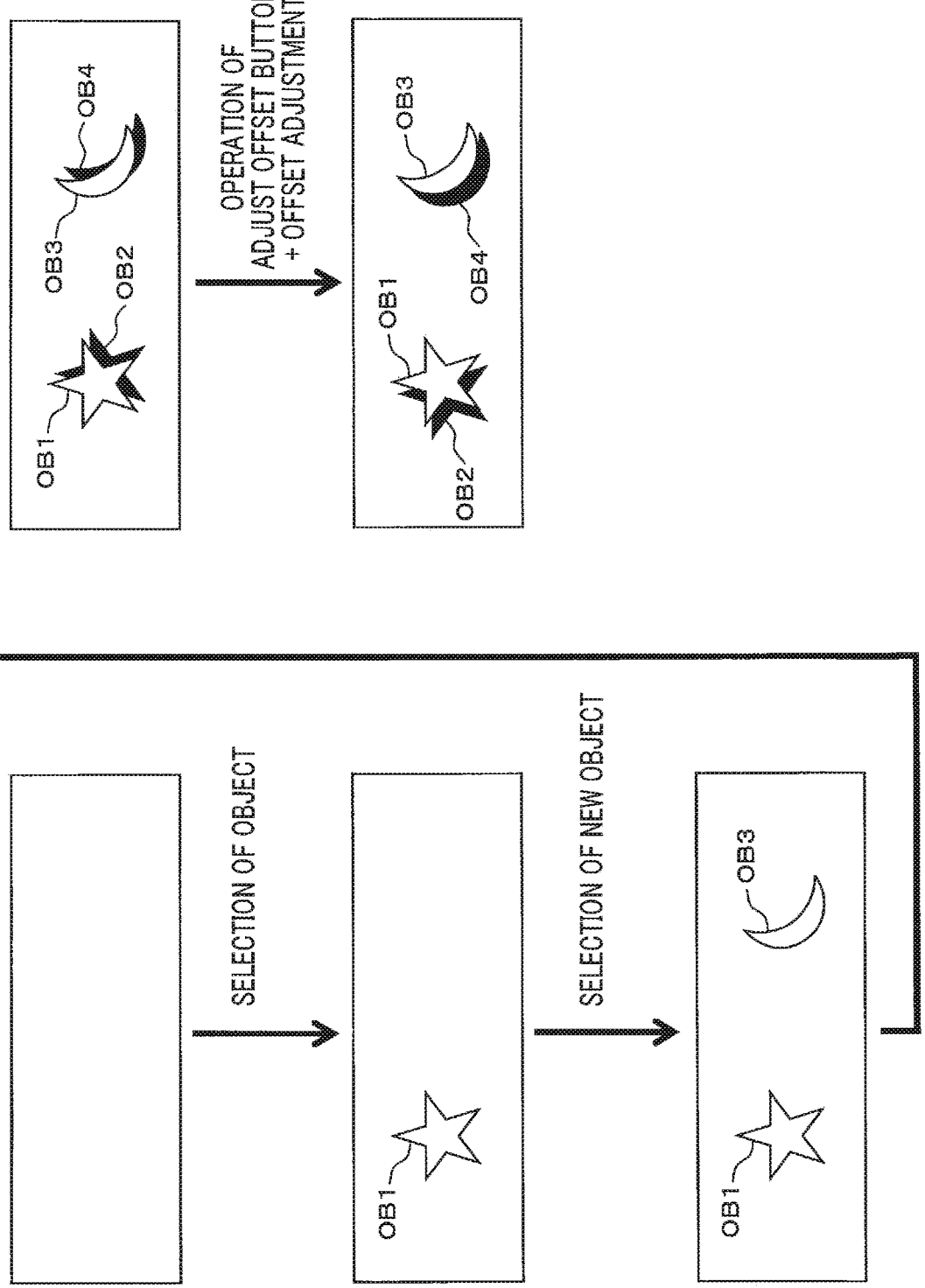
FIG. 7 is an explanatory diagram illustrating an example of screen transitions in an image display area.

FIG. 7 shows another example of screen transitions in the image display area 53. As shown in FIG. 7, in the initial state of the image display area 53 while the user has not yet selected an object, an image of a white label is displayed in the image display area 53. When the user subsequently selects a desired first object OB1, a label image having the first object OB1 formed thereon is displayed in the image display area 53. The user can adjust the position of the first object OB1 on the label through suitable operations. When the user then selects a new third object, the third object OB3 is added to the label image displayed in the image display area 53. The user can adjust the position of the third object OB3 on the label image through suitable operations.

In a case that the user subsequently operates the Composite Label button 55 while both the first object OB1 and third object OB3 are selected, a second object OB2 corresponding to the first object OB1 and a fourth object OB4 corresponding to the third object OB3 are added to the label image displayed in the image display area 53. The second object OB2 and the fourth object OB4 are displaced by a preset offset from those of the first object OB1 and the third object OB3, respectively. Next, the user can operate the Adjust Offset button 56 to adjust the offset for the second object OB2 and fourth object OB4 in the offset adjustment screen. At this time, the second object OB2 and fourth object OB4 are both shifted in the image display area 53 based on the user input.

Thus, rather than executing a label data generation process by operating the Composite Label button 55 while a single object is selected, as shown in FIG. 6 described above, the user may execute the label data generation process on a plurality of objects at the same time by operating the Composite Label button 55 while the objects are selected, as shown in FIG. 7 described above.

Figure 8:
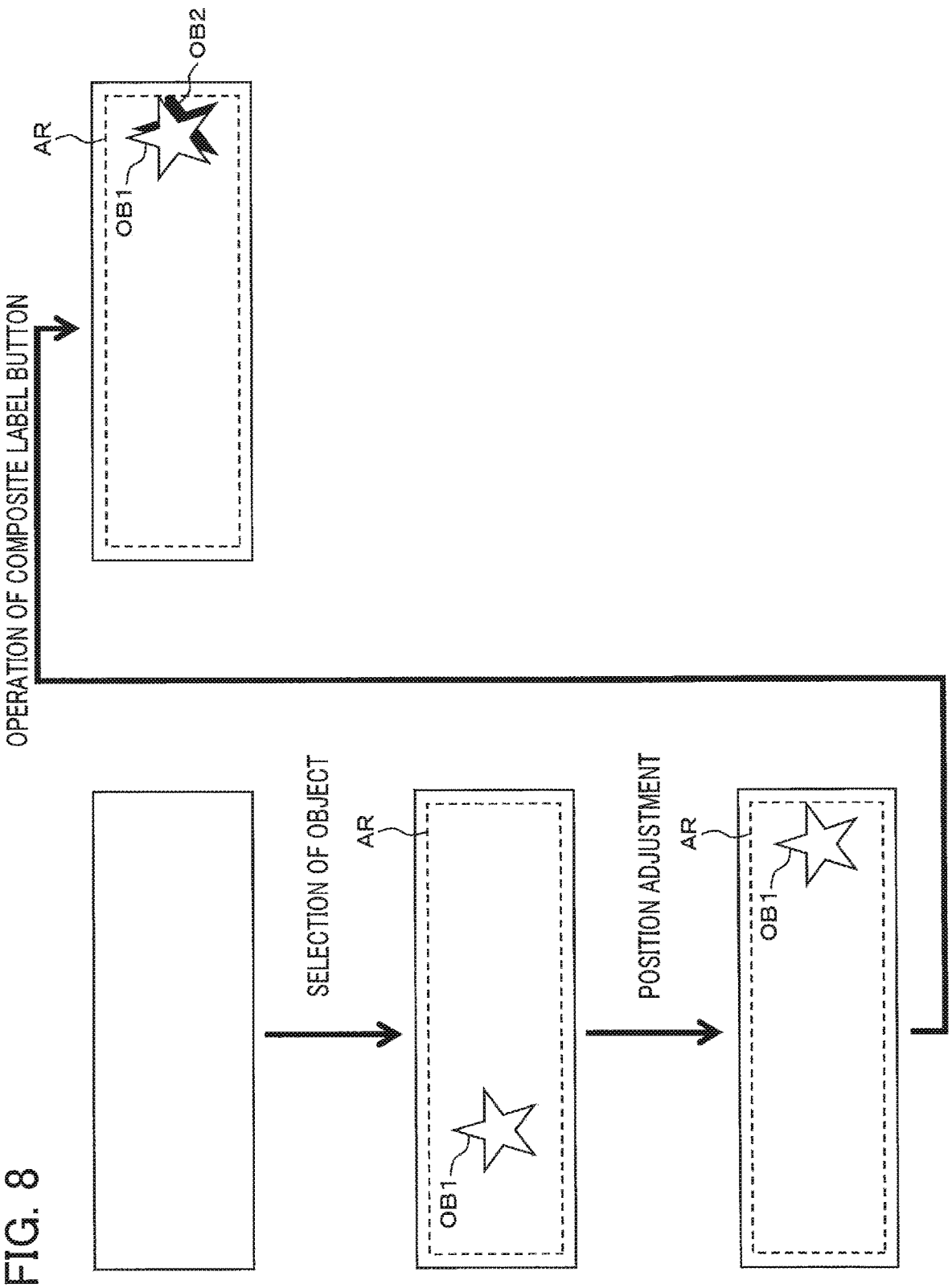
FIG. 8 is an explanatory diagram illustrating an example of screen transitions in the image display area.

FIG. 8 shows yet another example of screen transitions in the image display area 53. As shown in FIG. 8, in the initial state of the image display area 53 in which the user has not yet selected an object, an image of a white label is displayed in the image display area 53. When the user subsequently selects a desired first object OB1, a label image on which the first object OB1 is formed is displayed in the image display area 53. The user can adjust the position of the first object OB1 on the label image through suitable operations. In the example shown in FIG. 8, the first object OB1 has been moved near the upstream end in the conveying direction within a printing area AR.

As described above, the offset of the second object OB2, which is automatically arranged when the Composite Label button 55 is operated, is set toward the upstream side of the first object OB1 in the conveying direction. This is because, when the label is printed horizontally, text in the label is normally read from left to right, i.e., from the downstream side toward the upstream side of the conveying direction. Consequently, the second object OB2, which functions as a shadow, appears more natural when offset toward the upstream side in the conveying direction.

When the user operates the Composite Label button 55 while the first object OB1 is arranged near the upstream end in the conveying direction of the printing area AR, as described above, a second object OB2 corresponding to the first object OB1 is added to the image of the label displayed in the image display area 53. However, since there is not enough space to form the entire second object OB2 as usual, portions of the second object OB2 extending beyond the printing area AR are eliminated, as illustrated in FIG. 8. Since the second object OB2 is a supplementary object provided for giving the first object OB1 a three-dimensional appearance, eliminating a small portion of the second object OB2 will have little effect on its appearance, thereby maintaining the appearance of the composite label L3 as the user has envisioned without having to modify the length of the label or the position of the first object OB1.

Control Procedure

A sample control procedure executed by the CPU 31 of the information terminal 3 or 4 in order to realize label creation and the like according to the present embodiment will be described with reference to the flowcharts in FIGS. 9 through 11. The CPU 31 begins this control procedure by executing the printing application stored on the information terminal 3 or 4. Although not described in the flowcharts, it will be assumed that required settings, such as the format, label width, and label length have already been set through operations on the format selection section 51 and the like.

Figure 9:
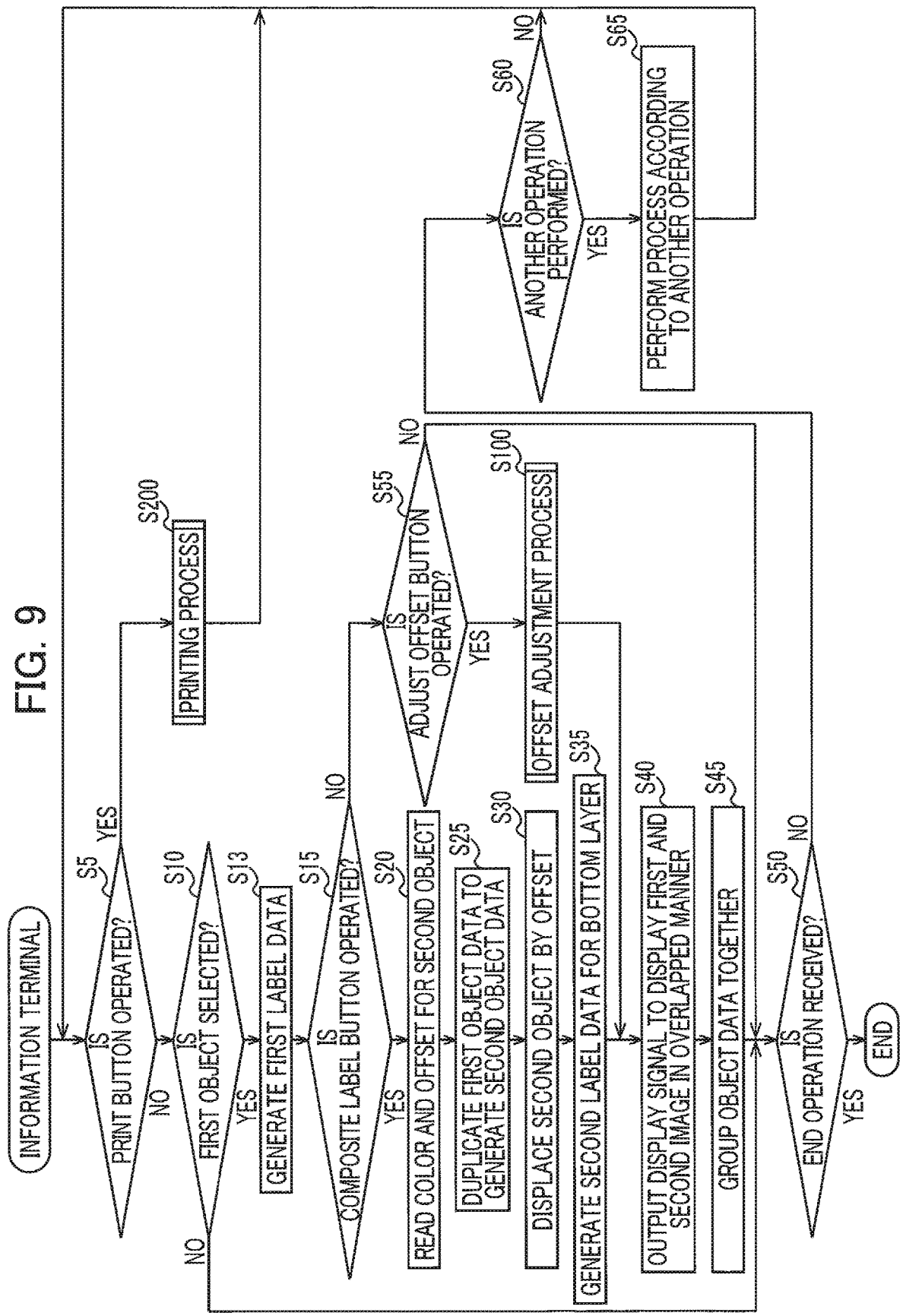
FIG. 9 is a flowchart illustrating a control procedure executed by a CPU in the information terminal.

In S5 of FIG. 9, the CPU 31 determines whether the user inputted a print command, i.e., whether the Print button 54 was operated. The CPU 31 advances to S10 when determining that a print command was not issued (S5: NO).

In S10 the CPU 31 determines whether the user performed a selection operation on a object as the first object. The CPU 31 advances to S50 when determining that a first object was not selected (S10: NO) and advances to S13 when determining that a first object was selected from the object selection screen (S10: YES).

After the user has selected one first object in S10, has allowed a second object to be generated, and has adjusted the offset of the second object in subsequent steps, the user can select another object in S10. Alternatively, the user can select a plurality of objects at one time in S10. An additional object selected in such cases will be called the third object in this embodiment for convenience.

In S13 the CPU 31 generates first label data that includes first object data for forming the first object selected in S10 on a label. In S13 the CPU 31 displays the first object in the image display area 53. Accordingly, the label editing screen displays the first object as well as the Composite Label button 55. When the user has additionally selected a third object, the CPU 31 generates first label data that includes third object data in addition to the first object data. In this case, the CPU 31 displays the third object together with the first object in the image display area 53.

In S15 the CPU 31 determines whether the user has issued an instruction to create a composite label, i.e., whether the Composite Label button 55 was operated. In other words, the CPU 31 determines whether the operation information indicating that the prescribed operation has been received. Here, the prescribed operation is an operation of the Composite Label button 55. The determination process performed in S15 and in S55 described later is a process to determine whether the user performed an operation on the first object selected in S10. When the CPU 31 determines that the user issued an instruction to create a composite label, that is, the operation information has been received (S15: YES), the CPU 31 advances to S20.

In S20 the CPU 31 reads the color and offset for second object prestored in the memory 32. Note that when the offset for the second object OB2 was adjusted (updated) in an offset adjustment process described later in S100, the CPU 31 reads the value of this updated offset.

In S25 the CPU 31 generates second object data based on the first object data. Specifically, the CPU 31 generates the second object data by duplicating the first object data while setting its color to the color that was read in S20. Note that when a third object has been additionally selected, the CPU 31 also generates fourth object data based on the third object data.

In S30 the CPU 31 displaces the second object of the second object data generated in S25 by the offset read in S20. That is, the CPU 31 associates the offset read in S20 with the second object data generated in S25 so that the second object is depicted and printed to be displaced from the first object data by the offset. In other words, the CPU 31 sets the offset of the second object to the value read in S20. When an additional third object was selected, the CPU 31 also associates the offset read in S20 with the fourth object data generated in S25. At this time, in a case that the second object (fourth object) extends beyond the end of the label according to the label length set in the format selection section 51 after the second object data (fourth object data) is shifted the offset amount, the CPU 31 generates second object data (fourth object data) representing the portion of the second object (fourth object) excluding the portion that protrudes beyond the end of the label.

In S35 the CPU 31 generates second label data that includes the second object data that was generated in S25 and is shifted in S30. When a third object was additionally selected, the CPU 31 generates second label data that includes the fourth object data in addition to the second object data. The CPU 31 sets the first label data as the top layer and the second label data as the bottom layer.

In S40 the CPU 31 outputs display signals to the touchscreen 37 or display 34 to display a first image represented by the first label data and a second image represented by the second label data on the touchscreen 37 or display 34 such that the first image overlaps the second image. That is, the display signals are for displaying a composite image in which the first image and the second image overlap. As a result, the first image based on the first label data and the second image based on second label data are overlapped when drawn in the image display area 53 of the editing screen. The process of S40 is an example of the display signal outputting process.

In S45 the CPU 31 groups together the first object data and the second object data to be processed altogether. The process of S45 is an example of the grouping process.

In S50 the CPU 31 determines whether the user performed an operation to end the process, such as an operation to quit the printing application. The CPU 31 advances to S60 described later when determining that an operation to end the process was not performed (S50: NO). The CPU 31 ends the control procedure when determining that an operation to end the process was performed (S50: YES).

On the other hand, when the CPU 31 determines in S15 that the user did not perform an operation to create a composite label (S15: NO), the CPU 31 advances to S55.

In S55 the CPU 31 determines whether the user performed an operation to adjust offset, i.e., whether the user operated the Adjust Offset button 56. When the CPU 31 determines that an operation to adjust offset was performed (S55: YES), the CPU 31 advances to S100 and executes an offset adjustment process. Subsequently, the CPU 31 advances to S40 described above. The offset adjustment process of S100 will be described later in greater detail.

However, when the CPU 31 determines in S55 that the user did not perform an operation to adjust offset (S55: NO), the CPU 31 advances to S50 described above.

In S60 the CPU 31 determines whether the user has performed any other operations. The CPU 31 returns to S5 when determining that no other operations were performed (S60: NO) and advances to S65 when determining that another operation was performed (S60: YES).

In S65 the CPU 31 executes a process corresponding to the other operation and subsequently returns to S5.

When the CPU 31 determined in S5 that the user inputted a print command (S5: YES), the CPU 31 advances to S200. In S200 the CPU 31 executes a printing process and subsequently returns to S5. The printing process of S200 will be described later in greater detail.

Figure 10:
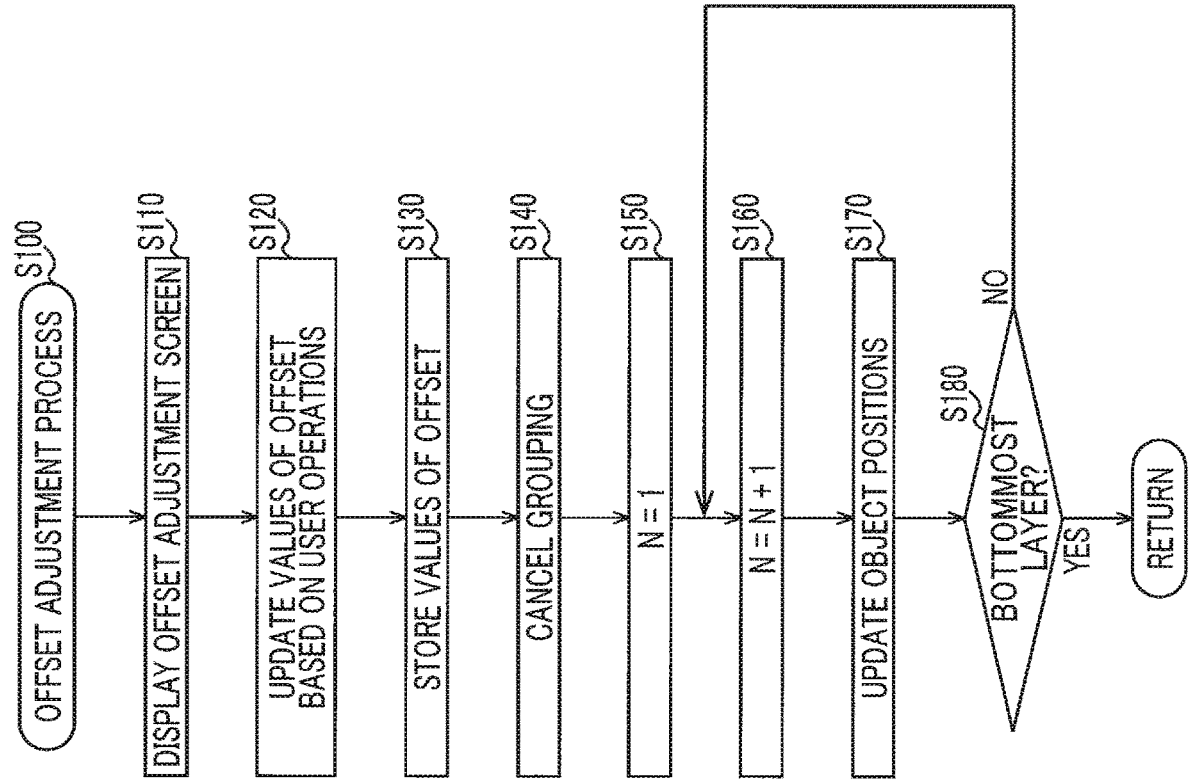
FIG. 10 is a flowchart illustrating an offset adjustment process shown in FIG. 9.

FIG. 10 shows a detailed example of the offset adjustment process in S100 described above. In S110 at the beginning of the process in FIG. 10, the CPU 31 displays the offset adjustment screen for adjusting the offset for objects on the touchscreen 37 or display 34, and specifically in the object editing display area 57.

In S120 the CPU 31 updates, from its initial values, to the values of offset based on operations the user performs on the position adjuster 58 or values the user inputs into the offset entry fields 59a and 59b in the offset adjustment screen.

In S130 the CPU 31 stores the values of offset updated in S120 in the memory 32, for example.

In S140 the CPU 31 cancels the grouping of the first object data and second object data formed in S45.

In S150 the CPU 31 initializes the value of a variable N representing the layer number of the processed label to 1. The value "1" of the variable N denotes the topmost layer and the maximum value of N denotes the bottommost layer.

In S160 the CPU 31 increments the value of the layer number N by 1.

In S170 the CPU 31 updates the position of each object in the label data for the N-th layer based on the value of offset that was stored in S130.

In S180 the CPU 31 determines whether the N-th layer is the bottommost layer. Since the composite label L3 in the example of the embodiment is configured of two layers, the first label L1 and the second label L2, the second layer is the bottommost layer. When the CPU 31 determines that the N-th layer is not the bottommost layer (S180: NO), the CPU 31 returns to S160. Accordingly, steps S160 and S170 are repeated until the object position has been updated for all layers of label data except the first layer, which is the top layer. When the CPU 31 determines that the N-th layer is the bottommost layer (S180: YES), the CPU 31 advances to S40 in FIG. 9.

Figure 11:
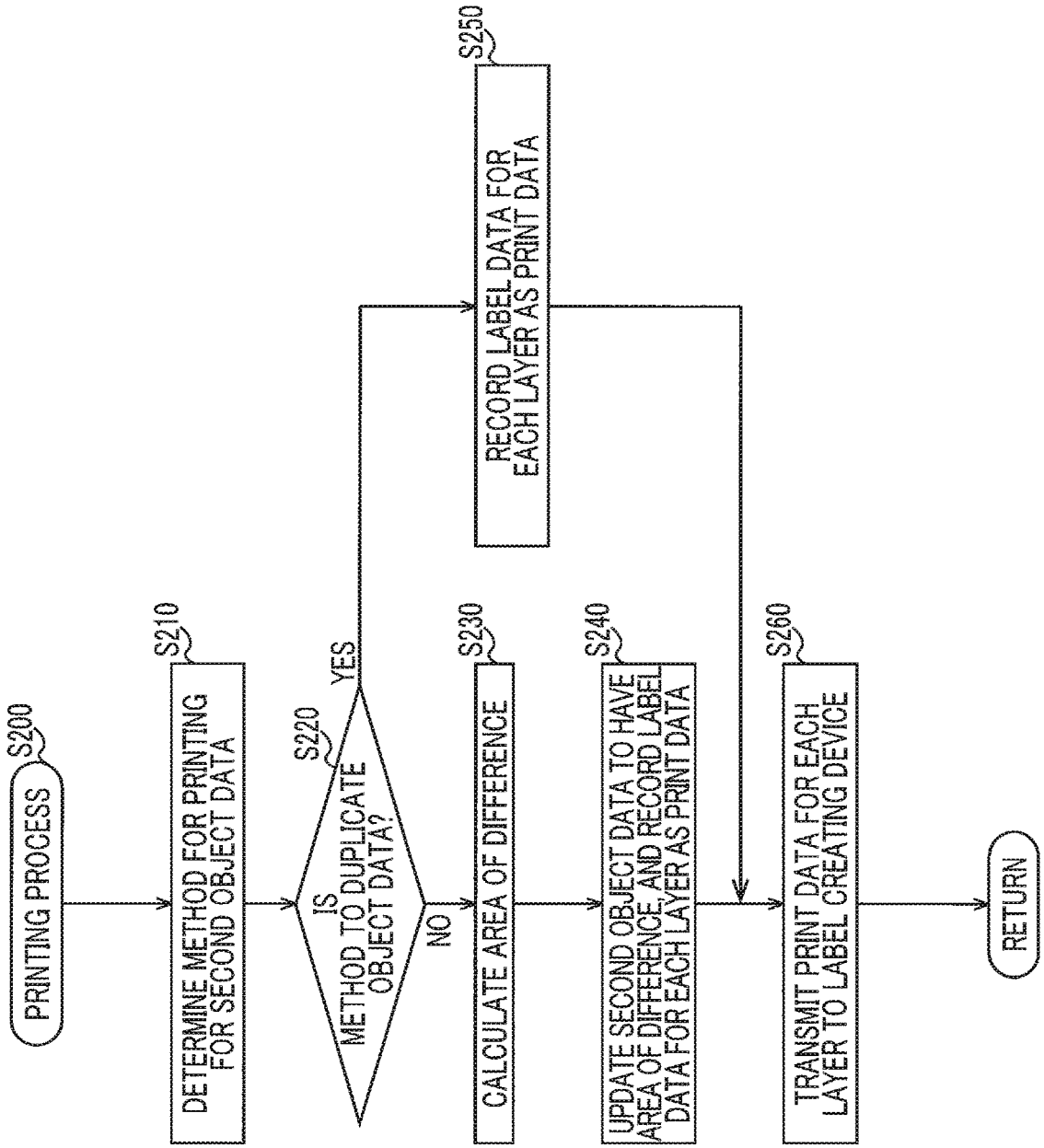
FIG. 11 is a flowchart illustrating a printing process shown in FIG. 9.

FIG. 11 shows a detailed example of the printing process in S200. In S210 of FIG. 11, the CPU 31 selects a method for printing the image of the second object data. Two methods of printing second object data are provided in this embodiment. In the first printing method, the CPU 31 generates second object data by duplicating the first object data so that the second object OB2 based on the second object data has the same shape as the first object OB1 based on the first object data and prints the second object based on the second object data so that the second object OB2 is offset from the first object OB1. In the second printing method, the CPU 31 generates the second object data by arranging the second object OB2 and print the second object OB2 based on the second object data. In the second printing method, the second object OB2 is obtained by placing the object (virtual object), which has the same shape as the first object OB1, at a position shifted from the first object OB1 by the prescribed offset, and subsequently excluding the area of the first object OB1 from the area of this shifted object (virtual object). The CPU 31 selects the second printing method, for example, when the first object OB1 on the first label L1 has a highly transparent color through which the second object OB2 would be visible if a first object OB1 and second object OB2 of the same shape were overlapped; when the second label L2 is set as the top layer due to such circumstances as there being no cartridge 5 having a transparent base label with the correct printing color for the first object OB1; or when specified through a user setting. The CPU 31 selects the first printing method in all other cases.

In S220 the CPU 31 determines whether the printing method selected in S210 is the method of generating second object data by duplicating the first object data, i.e., the first printing method. The CPU 31 advances to S230 when determining that the second printing method was selected (S220: NO).

In S230 the CPU 31 calculates the area of difference between the first object ant the shifted object (virtual object) produced by shifting the first object the prescribed offset and the original object (first object) prior to this shift. That is, this area of difference is obtained by excluding the area of the first object from the area of the shifted object.

In S240 the CPU 31 updates the second object data in the second label data generated above in S35 to the data representing the updated second object OB2 (see FIG. 4). Here, the updated second object OB2 is obtained by excluding a part of the second object prior to update (FIG. 3) so that the updated second object has the area of difference calculated in S230. Subsequently, the CPU 31 records the first label data and second label data as print data for the corresponding layers. Subsequently, the CPU 31 advances to S260 described later.

When the CPU 31 determines in S220 that the first printing method was selected (S220: YES), the CPU 31 advances to S250.

In S250 the CPU 31 records the first label data and second label data generated above in S13 and S35, respectively, as print data for the corresponding layers. Subsequently, the CPU 31 advances to S260.

In S260 the CPU 31 transmits the print data recorded for each layer to the label creating device 2. In response, the CPU 21a of the label creating device 2 executes a print control process to create the first label L1 by printing the image based on the first label data on the label tape TP and to create the second label L2 by printing the image based on the second label data on the label tape TP. Subsequently, the CPU 31 returns to S5 in FIG. 9.

The processes of S20-S35 and S230-S240 are an example of the label data generation process.

Effects of the First Embodiment

In the first embodiment described above, the CPU 31 of the information terminal 3 or 4 performs the label data generation process in steps S20-S35 and steps S230-S240. In the label data generation process, the CPU 31 uses first object data included in first label data to generate second object data to be included in second label data.

When the first label L1 is created by printing the image based on the first label data on the label tape TP with the label creating device 2, the first object OB1 is formed on the first label L1 based on the first object data. When the second label L2 is created by printing the image based on the second label data on the label tape TP, the second object OB2 is formed on the second label L2 based on the second object data.

The second object data is generated in the label data generation process based on the first object data. The second occupied area of the second label L2 occupied by the second object OB2 and the first occupied area of the first label L1 occupied by the first object OB1 are shifted so as to overlap each other partially but not entirely.

In the present embodiment, the second object data included in the second label data for creating the second label L2 is generated using the first object data included in the first label data for creating the first label L1. For example, the second object OB2 based on the second object data has the same shape as the first object OB1 based on the first object data but is laid out to be offset from the first object OB1, as described above. The resulting label when the first label L1 and second label L2 are overlaid has a three-dimensional effect.

A particular feature of this embodiment is that in certain cases the second object data is generated through steps S230-S240 as data representing an area of difference between new object (the shifted object, or the virtual object) produced by shifting the first object a prescribed amount and the original object (the first object) prior to shifting. Therefore, the second object OB2 based on the second object data is arranged adjacent to the outline of the first object OB1 based on the first object data and has a shape conforming to the shape of the first object OB1 so that the combination of the first object OB1 and the second object OB2 expresses that the first object OB1 was moved from the position of the second object OB2. As a result, the label can be given a three-dimensional effect when the first label L1 and second label L2 are overlaid. Further, in a case that the first object OB1 on the first label L1 is in a color that tends to be transparent so that the second object OB2 would be visible through the first object OB1 if a second object OB2 and first object OB1 having the same shape were overlaid, for example, the second object OB2 can be formed to have the area of difference to prevent this second object OB2 from being visible through the first object OB1, thereby preventing the appearance of the composite label L3 from being degraded. This method can also support cases in which the second label L2 is used as the top layer due to such circumstances as a lack of cartridges 5 having a transparent base layer and the necessary printing color for the first object OB1.

Another feature of the present embodiment is that the CPU 31 of the information terminal 3 or 4 generates the second label data using the first object data in the label data generation process when the CPU 31 acquires information indicating that the Composite Label button 55 was operated. This acquisition of operation information enables the CPU 31 to clearly confirm the user's intention to create a label with a three-dimensional effect.

Another feature of the present embodiment is that the CPU 31 of the information terminal 3 or 4 executes step S260 to print a first object OB1 on the label tape TP based on the first label data and to print a second object OB2 on the label tape TP to function as a shadow of the first object OB1, for example.

Another feature of the present embodiment is that a first image represented by the first label data and a second image represented by the second label data are displayed on the touchscreen 37 or the display 34 based on display signals that the CPU 31 outputs in step S40 described above. Since the color of the second object data included in the second label data differs from the color of the first object data included in the first label data, the first image and second image are also displayed in different colors on the touchscreen 37 or the display 34. Thus, the user can visually confirm the difference in the colors of the first label L1 and the second label L2, which are to be created, on the basis of the difference in colors of the first image and second image displayed on the touchscreen 37 or display 34.

Another feature of the present embodiment is that the color of the second object OB2 specific by the second object data is achromatic, i.e., a gray tone with no saturation. Accordingly, the second image corresponding to the second label L2 being generated is displayed in a gray tone on the touchscreen 37 or display 34. This display facilitates the user in recognizing the appearance of the second object OB2 as a shadow, for example, and can produce a label with a three-dimensional effect.

Another feature of the present embodiment is that the first image is displayed to appear to be overlapping the second image on the touchscreen 37 or the display 34 based on display signals that the CPU 31 outputs in S40 described above. This enables the user to visually recognize the state in which the second object OB2 functions as a shadow of the first object OB1, for example.

Another feature of the present embodiment is that in S45 the CPU 31 groups together the first object data and second object data to be processed at the same time. This method can reduce the user's operational burden by treating the second object data representing the second object OB2 that functions as a shadow, for example, together with the first object data representing the first object OB1 that functions as the object of the shadow.

Another feature of the present embodiment is that by grouping together the first object data and the second object data to be processed at the same time, the user can adjust the offset between the first object data and the second object data in the offset adjustment process of S100 described above. Accordingly, the user can adjust the distance between the second object OB2 serving as a shadow, for example, and the first object OB1 serving as the object of the shadow to a desired value.

Another feature of the present embodiment is that when the user has selected a plurality of objects and thus the first label data includes a plurality of sets of object data, the CPU 31 can generate a plurality of sets of object data for the second label data to produce a three-dimensional effect for each of the sets of object data in the first label data.

Another feature of the present embodiment is that the second object data corresponding to the first object data and the fourth object data corresponding to the third object data are automatically generated. Here, the first object data and the second object data are specified by the user. The offset for the second object data relative to the first object data is set equal to the offset for the fourth object data relative to the third object data. Accordingly, the CPU 31 sets uniform positional relationships between a plurality of objects on the first label and a plurality of objects on the second label when printing the image of the first label data and the image of the second label data, thereby avoiding inconsistencies that can detract from the appearance of the label.

Another feature of the present embodiment is that the length of the second label specified by the second label data, which includes the second object data that functions as a shadow, for example, is equal to the length of the first label specified by the first label data that includes the first object data functioning as the object that produces the shadow. Accordingly, the lengths of the first label L1 and second label L2 can be set the same, regardless of the presence or absence of a shadow, and the user can more easily position the labels when bonding the first label L1 and second label L2 together.

SECOND EMBODIMENT

Next, a second embodiment of the present disclosure will be described. The second embodiment describes a case in which the user selects a template on an information terminal to generate data for a first object and a second object.

The overall configuration of the printing system 1 according to the second embodiment, the configurations of the information terminals 3 and 4 and the label creating device 2, the configuration of the composite label L3, and the like are identical to those in the first embodiment described above and, hence, a description of these configurations has been omitted here.

Label Editing Screen

Figure 12:
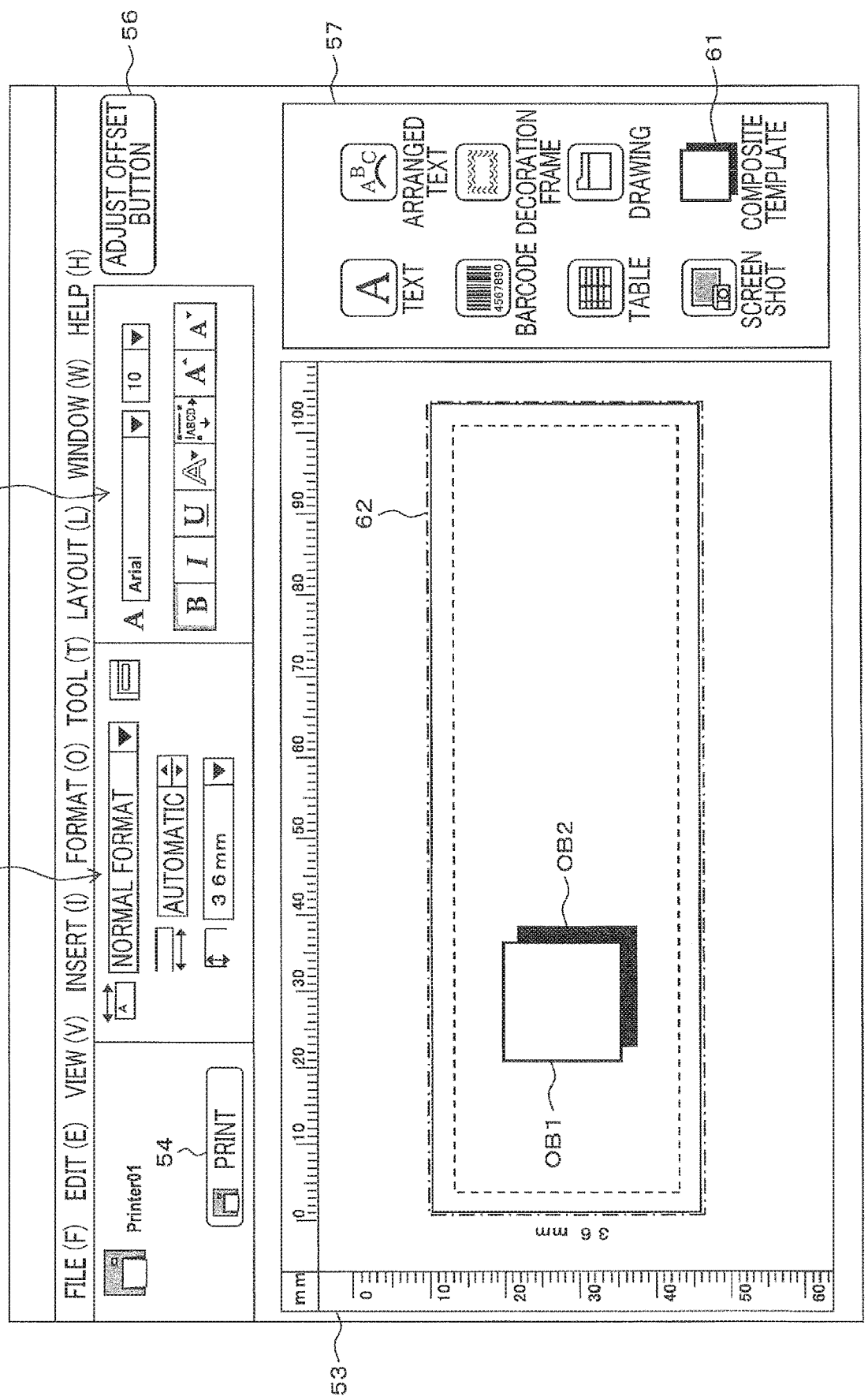
FIG. 12 is an explanatory diagram illustrating an example of the label editing screen displayed on the touchscreen of the information terminal and the display of the information terminal.

FIG. 12 shows an example of a label editing screen displayed on the touchscreen 37 of the information terminal 3 or the display 34 of the information terminal 4 in the second embodiment. As shown in FIG. 12, the label editing screen includes the format selection section 51, the font selection section 52, the image display area 53, the Print button 54, the Adjust Offset button 56, the object editing display area 57, and the like described above in the first embodiment. A template selection screen is displayed in the object editing display area 57.

In place of the objects that were displayed in the object selection screen, various template icons including a composite template icon 61 are displayed in the template selection screen so that the user can select a desired template by selecting one of the template icons. The composite template icon 61 is associated with composite template data. The composite template data is an example of template data. The composite template data includes first label template data and second label template data. The first label template data includes first object data corresponding to the first object OB1. The second label template data includes second object data corresponding to the second object OB2. The composite template data also includes specified format information (e.g., information specifying the type of cartridge to be used for printing and the printing length), and information related to the layout positions of the first object OB1 and second object OB2. The format information includes information on a border of the print label. The composite template data associates content of the first object data with content of the second object data and includes data indicating the offset of the second object OB2 relative to the first object OB1. The "offset" includes both the direction and distance of offset. The composite template data may be stored in the memory 32 or the high-capacity storage 36. Further, template data for other templates images may be stored in the memory 32 or the high-capacity storage 36.

When the composite template icon 61 is selected, a border 62, the first object OB1, and the second object OB2 are displayed in the image display area 53 based on the format information included in the composite template data. The border 62 represents the perimeter of the print label on which the first object OB1 and the second object OB2 are to be printed on the basis of the format information. In the present embodiment, the first object OB1 is a square figure in a chromatic color such as red, blue, or yellow, and the second object OB2 is a square figure of the same shape as the first object OB1 in black, for example.

As an alternative, the composite template data may be data on a template that includes data specifying the offset between objects and the like but that does not include the first object data and second object data. In this case, the user may select and input a desired first object into the composite template data to generate second object data on the basis of the offset specified in the template data.

Transition of Screens in the Image Display Area

Figure 13:
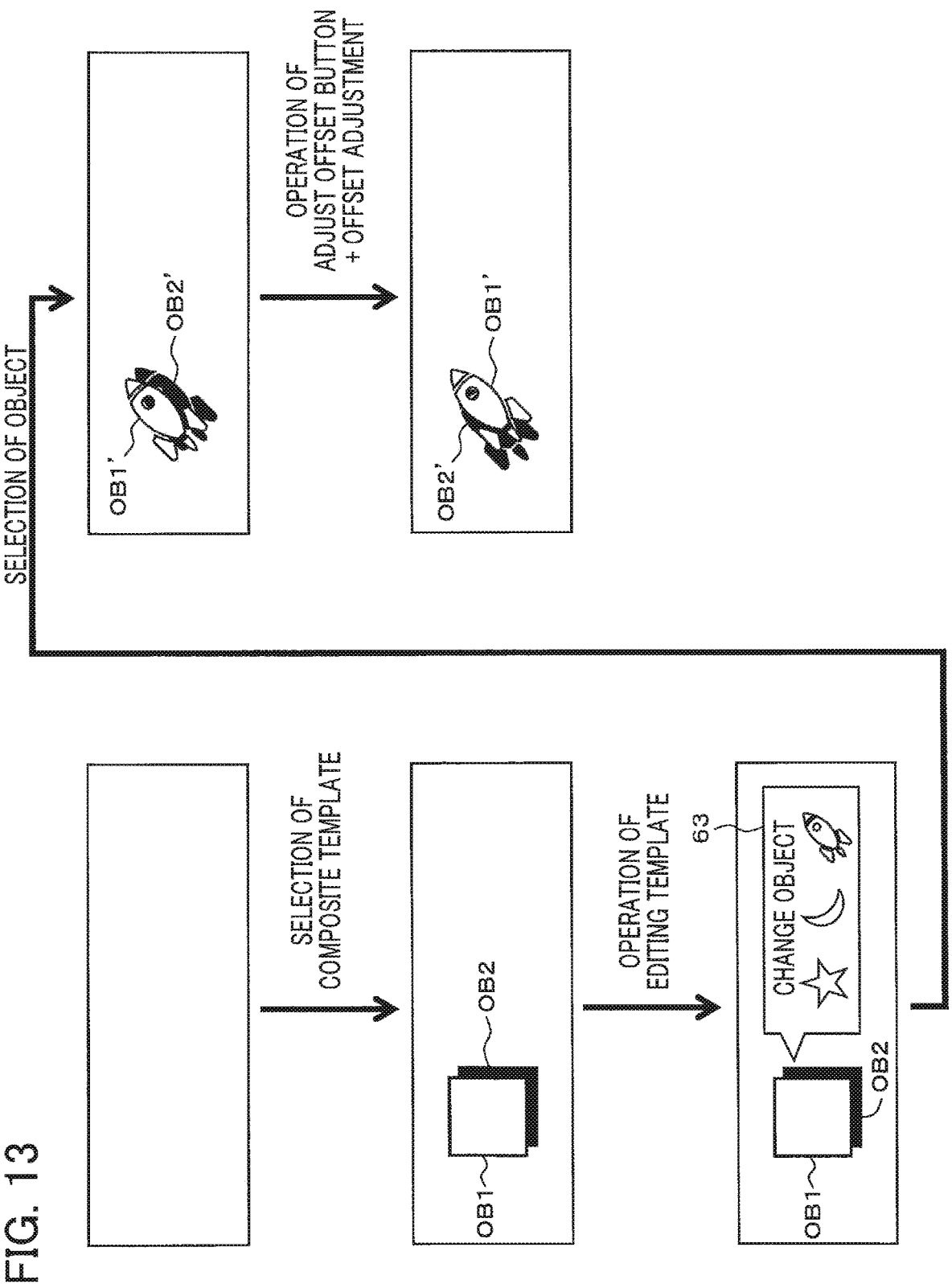
FIG. 13 is an explanatory diagram illustrating an example of screen transitions in an image display area.

FIG. 13 shows one example of screen transitions in the image display area 53. As shown in FIG. 13, in the initial state of the image display area 53 while the user has not yet selected an object, an image of a white label is displayed in the image display area 53. When the user subsequently selects the composite template icon 61, a label image including the first object OB1 and the second object OB2 corresponding to the composite template icon 61 is displayed in the image display area 53. The first object OB1 and the second object OB2 are grouped together, enabling the user to adjust the positions of the first object OB1 and second object OB2 at the same time through suitable operations.

By performing a suitable operation to edit the template while the first object OB1 and the second object OB2 are selected, the user can display a template editing screen 63 in the image display area 53. A plurality of objects is displayed in the template editing screen 63, and the user can change the object being printed by selecting a desired object in the template editing screen 63.

When the user selects a new object to use in place of the current object, the image display area 53 displays a modified first object OB1' and a corresponding second object OB2' on the label. The second object OB2' is displaced from the first object OB1' by the offset included in the composite template icon 61. In other words, the offset between the second object OB2 and the first object OB1 is equal to the offset between the second object OB2' and first object OB1'.

When the user subsequently operates the Adjust Offset button 56 to adjust the offset for the second object OB2' in the offset adjustment screen, the second object OB2' moves in the image display area 53 in accordance with the user-inputted offset. In the example of FIG. 13, the offset for the second object OB2' is adjusted in order to move the second object OB2' downstream in the conveying direction relative to the first object OB1'.

Control Procedure

Figure 14:
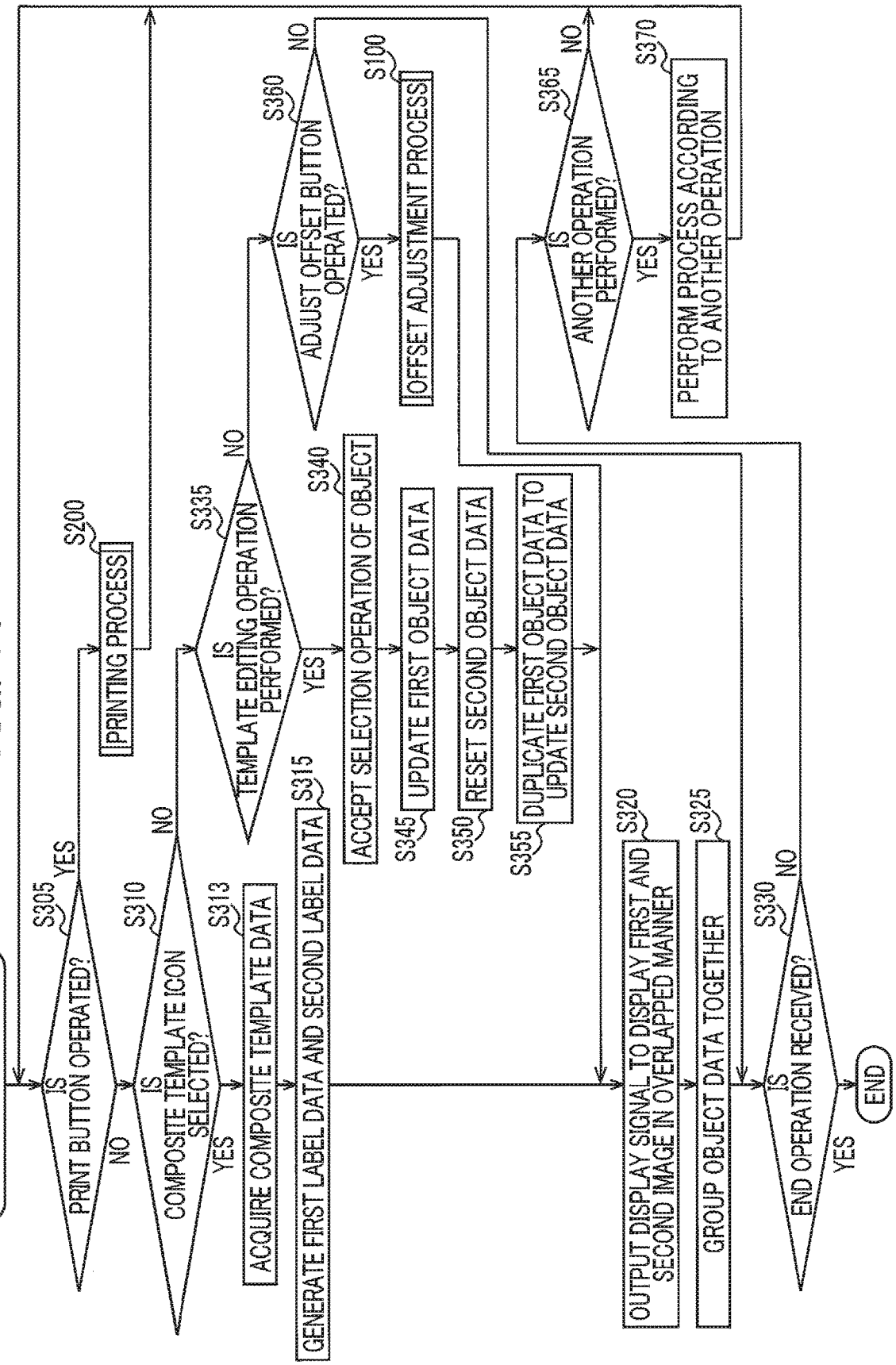
FIG. 14 is a flowchart illustrating a control procedure executed by the CPU in the information terminal.

Next, a sample control procedure executed by the CPU 31 of the information terminal 3 or 4 to achieve label creation and the like in the present embodiment will be described with reference to the flowchart in FIG. 14. Note that steps in FIG. 14 that are identical to those described in FIG. 9 and the like, such as steps S100 and S200, have been designated with the same step numbers to avoid duplicating description.

In S305 the CPU 31 determines whether the user inputted a print command, i.e., whether the Print button 54 was operated. The CPU 31 advances to S200 when determining that a print command was inputted (S305: YES) and advances to S310 when determining that a print command was not inputted (S305: NO).

In S310 the CPU 31 determines whether the user performed an operation to select the composite template icon 61. When the CPU 31 determines that a selection operation to select the composite template icon 61 was performed (S310: YES), the CPU 31 advances to S313.

In S313 the CPU 31 acquires the composite template data associated with the composite template icon 61 that was selected in S310. As described above, the composite template data has the first label template data including the first object data, the second label template data including the second object data, and the offset of the second object OB2 relative to the first object OB1. The process of S313 is an example of the template data acquisition process.

In S315 the CPU 31 generates first label data including first object data for forming the first object OB1 on a label, and second label data including second object data for forming the second object OB2 on a label on the basis of the template data acquired in S313.

Steps S320-S330 are identical to steps S40-S50 described above in FIG. 9 and, hence, a description of these steps has been omitted.

When the CPU 31 determines in S310 that a selection operation to select the composite template icon 61 was not performed (S310: NO), the CPU 31 advances to S335.

In S335 the CPU 31 determines whether the user performed a template editing operation. When the CPU 31 determines that a template editing operation was performed S335: YES), the CPU 31 advances to S340.

In S340 the CPU 31 displays the template editing screen 63 and accepts user operations for selecting a new object to use in place of the current object. Here, the user operations is for making an instruction to change the first object data.

In S345 the CPU 31 updates the first object data in the first label template data included in the composite template data to data for the object selected in S340. In other words, the CPU 31 replaces, according to the instruction to change the first object data, the first object data in the first label template data with updated first object data so that the first label template data includes the updated first object data in place of the first object data.

In S350 the CPU 31 resets the second object data in the second label template data included in the composite template data.

In S355 the CPU 31 updates second object data using the first object data that was updated in S345. Specifically, the CPU 31 newly generates object data by duplicating the first object data in the color for the second object data included in the composite template data. The CPU 31 updates the second object data in the second label template data included in the composite template data to be the newly generated data. In other words, through the processes of S350 and S355 the CPU 31 replaces, on the basis of the first label template data including the updated first label data, the second object data in the second template data with updated second object data so that the second template data includes the updated second object data in place of the second object data. In S355 the CPU 31 generates the first label data and the second label data on the basis of the label template data in which the first label template data and the second label template data are updated. Subsequently, the CPU 31 advances to S320 described above.

When the CPU 31 determines in S335 that the user did not perform a template editing operation (S335: NO), the CPU 31 advances to S360. Since steps S360, S100, S365, and S370 are identical to steps S55, S100, S60, and S65 described above in FIG. 9, a description of these steps has been omitted here.

Effects of the Second Embodiment

As described above in the second embodiment, the composite template data acquired in S313 has the first label template data including the first object data and the second label template data including the second object data and associates the content of the first object data with the content of the second object data. Accordingly, the first label data and the second label data can be generated based on the template data. Therefore, the template data can be used to create a label having a three-dimensional effect.

THIRD EMBODIMENT

Next, a third embodiment of the present disclosure will be described. The third embodiment describes a case in which the user selects a first object on a first label to generate data of a second object for a second label on the label creating device 2.

The overall configuration of the printing system 1 according to the third embodiment, the configurations of the information terminals 3 and 4 and the label creating device 2, the configuration of the composite label L3, and the like are identical to those in the first embodiment described above and, hence, a description of these configurations has been omitted here.

Control Procedure

Next, a sample control procedure executed by the CPU 21*a* of the label creating device 2 in order to achieve label creation and the like in the present embodiment will be described with reference to the flowchart in FIG. 15.

Figure 15:
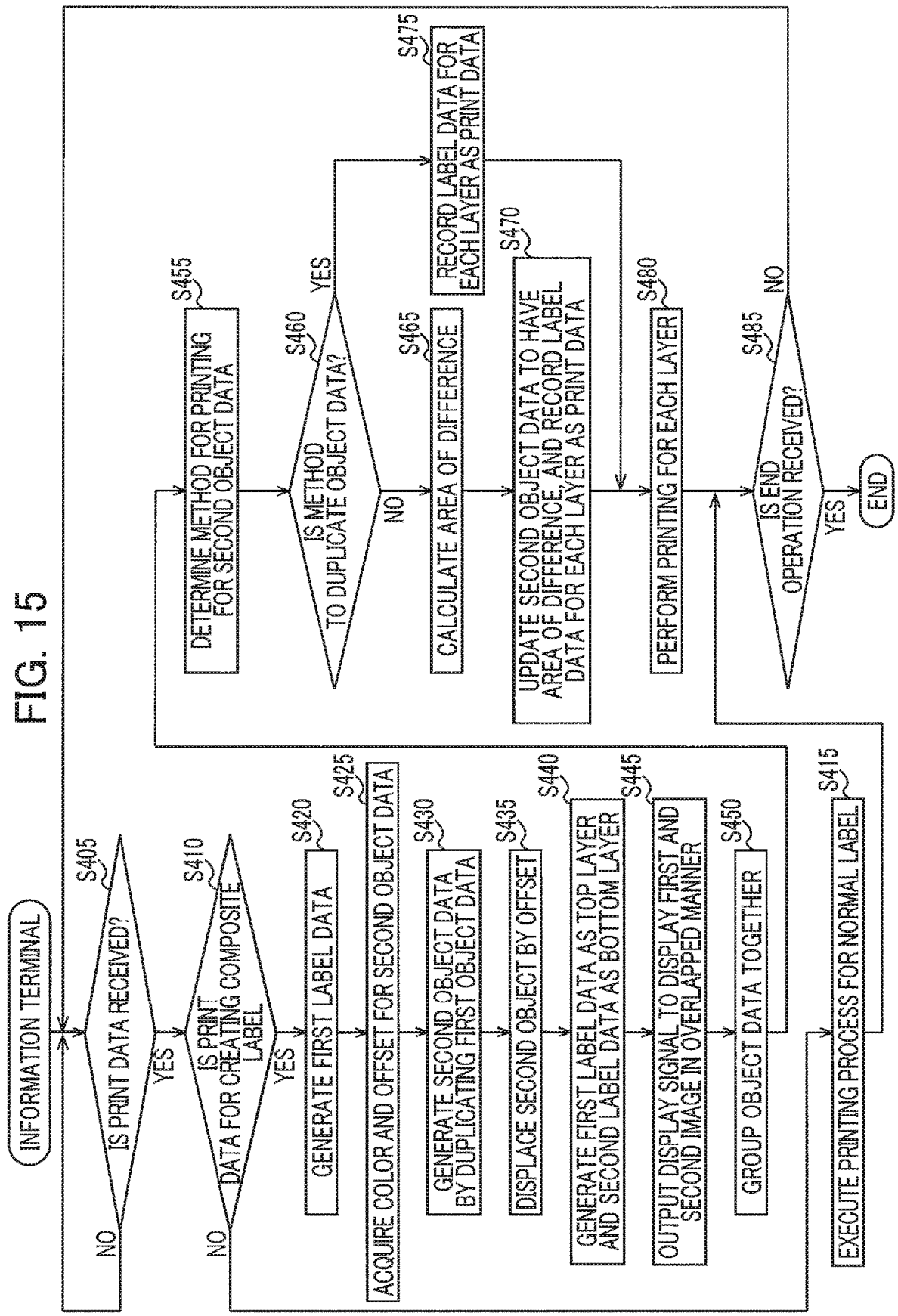
FIG. 15 is a flowchart illustrating a control procedure executed by the CPU in the information terminal.

In S405 of FIG. 15, the CPU 21*a* determines whether print data was received from the information terminal 3 or 4. The print data received from the information terminal 3 or 4 in the present embodiment corresponds to the first label data described above. The first label data includes first object data from which a first object OB1 is formed on a first label L1. The print data may also include composite information indicating that the first label L1 is for a composite label to overlay or be overlaid on another label. The CPU 21*a* waits at this step S405 while print data has not been received (S405: NO). Once print data is received (S405: YES), the CPU 21*a* advances to S410.

In S410 the CPU 21*a* determines whether the print data received in S405 is to be used for creating a composite label based on whether the print data includes composite information. When the CPU 21*a* determines that the print data is not for creating a composite label, that is, the print data does not include the composite information (S410: NO), the CPU 21*a* advances to S415.

In S415 the CPU 21*a* executes a printing process for a normal label. The normal label is a label to be used by itself rather than overlaying or being overlaid on other labels. Thereafter, the CPU 21*a* advances to S485 described later.

When the CPU 21*a* determines in S410 that the print data is for creating a composite label (S410: YES), the CPU 21*a* advances to S420.

In S420 the CPU 21*a* generates first label data that includes the first object data provided in the print data.

In S425 the CPU 21*a* acquires data indicating the color and offset for the second object data. The CPU 21*a* may acquire this data from the information terminal 3 or 4 together with the print data or by reading prescribed values that were stored in the RAM 21*b* or the high-capacity storage device 28 in advance.

In S430 the CPU 21*a* generates second object data based on the first object data. Specifically, the CPU 21*a* generates second object data by duplicating the first object data in the color acquired in S425.

In S435 the CPU 21*a* displaces the second object of the second object data generated in S430 by the offset acquired in S425. That is, the CPU 31 associates the offset acquired in S425 with the second object data generated in S430 so that the second object is depicted and printed to be displaced from the first object data by the offset. In other words, the CPU 31 sets the offset of the second object to the value acquired in S425.

In S440 the CPU 21*a* generates second label data that includes the second object data generated in S430 so that the second object is shifted from the first object by the offset acquired in S435. The CPU 21*a* sets the first label data as the top layer and the second label data as the bottom layer.

In S445 the CPU 21*a* outputs display signals to the display 26 to display a first image represented by the first label data and a second image represented by the second label data on the display 26 such that the first image overlaps the second image. Here, the display signals are to display the composite image in which the first image and the second image overlap. As a result, the first image based on the first label data and the second image based on the second label data are overlapped when drawn on the display 26. The process of S445 is an example of the display signal outputting process. In S445, the CPU 21*a* may receive a user's operation to adjust the offset via the input interface and adjust the offset according to the received operation.

In S450 the CPU 21*a* groups together the first object data and the second object data to be processed together. The process of S450 is an example of the grouping process.

In S455 the CPU 21*a* selects the method for printing the image of the second object data to either the first printing method or the second printing method using the same selection process described in S210 of FIG. 11.

In S460 the CPU 21*a* determines whether the printing method selected in S455 is the first printing method. The CPU 21*a* advances to S465 when determining that the second printing method was selected (S460: NO).

In S465 the CPU 21*a* calculates the area of difference between new object (virtual object) produced by shifting the first object the prescribed offset and the original object (first object) prior to this shift. The process of S465 is executed similarly the process of S230.

In S470 the CPU 21*a* updates the second object data included in the second label data generated in S440 by excluding a part of the second object prior to update so that the updated second object has the area of difference calculated in S465. Subsequently, the CPU 21*a* records the first label data and updated second label data as print data for the corresponding layers. Subsequently, the CPU 21*a* advances to S480 described later.

When the CPU 21*a* determines in S460 that the first printing method was selected (S460: YES), the CPU 21*a* advances to S475.

In S475 the CPU 21*a* records the first label data and the second label data generated above in S420 and S440, respectively, as print data for the corresponding layers. Subsequently, the CPU 21*a* advances to S480.

In S480 the CPU 21*a* executes a print control process by transmitting the print data recorded for each layer to the print head 25, controlling the print head 25 to create the first label L1 by printing the image of the first label data on the label tape TP and to create the second label L2 by printing the image of the second label data on the label tape TP.

In S485 the CPU 21*a* determines whether the user performed an operation to end the process, such as whether operation to turn off the power of the label creating device 2 was performed. When an operation to end the process was not performed (S485: NO), the CPU 21*a* returns to S405 described above. However, when an operation to end the process was performed (S485: YES), the CPU 21*a* ends the control procedure of FIG. 15.

The process of S425-S440 and S465-S470 are an example of the label data generation process. The CPU 21a may also execute an offset adjustment process similar to that described above in S100 when the user performs an operation to adjust offset in the above flowchart. Further, although the CPU 21a receives print data including first object data from the information terminal 3 or 4 in the third embodiment, the user may also perform an operation on the input interface 27 of the label creating device 2 for creating a composite label and may select a first object for use in creating the composite label. In this case, the CPU 21a uses the first object data representing this selected first object to generate the second object data. In this case, the user may further select a third object for use in creating the composite label, and the CPU 21 uses the third object data representing this third object to generate the fourth object data. Alternatively, the CPU 21a may receive the print data including the first object data and the third object data from the information terminal 3 or 4, and generate the second label data including the second object data and the fourth object data. In this case, the second object data and the fourth object data are generated based on the first object data and the second object data, and the second object and the fourth object are displaced in a manner the same as S430 and S435. Further, rather than the label creating device 2 receiving print data from the information terminal 3 or 4, the user may create print data through the display 26 and input interface 27 of the label creating device 2. In this case, the information received from the information terminal 3 or 4 in S405 and the like may be changed to information acquired from the RAM 21b.

Effects of the Third Embodiment

The third embodiment described above can obtain the same effects as the first embodiment described above.

The use of such terms as "perpendicular," "parallel," and "flat" in the above description are not intended to be taken in their strictest sense. In other words, the terms "perpendicular," "parallel," and "flat" may signify "substantially perpendicular," "substantially parallel," and "substantially flat" to allow for design and manufacturing tolerances and error.

When dimensions and sizes are described as being "identical," "equivalent," or "different" in appearance in the above description, these terms are not intended to be taken in their strictest sense. In other words, the terms "identical," "equivalent," and "different" may signify "substantially identical," "substantially equivalent," and "substantially different" to allow for design and manufacturing tolerances and error.

The flowcharts in FIGS. 9-11, 14, and 15 do not limit the present disclosure to the steps indicated therein. Steps may be added or deleted, or their order may be rearranged without departing from the scope of the present disclosure and the technical concept.

The technical elements described above in the embodiments and their variations may be used in any suitable combination.

While the first object is described as a figure in the embodiments, the first object is not limited to a figure but may be a text object comprising a string of characters. When the first object is a text object, a string including a plurality of characters may be treated as a single object.

The color of the second object data is not limited to an achromatic color, as in the embodiments. For example, a label having a three-dimensional effect may be produced by varying the density of the same hue, e.g., forming the first object in light blue and the second object in blue. Further, when the background color (i.e., the tape color for the first label) is a dark color such as black, for example, the color of the second object data may be set at a lower density than the color for the first object data. Alternatively, the user may be allowed to specify the color for the second object data.

In the above embodiments, the second object OB2 based on the second object data and the first object OB1 based on the first object data are described as having the same shape. However, any object that includes an area shifted from that of the first object OB1 can be used to produce a label having a three-dimensional effect when the first label L1 and second label L2 are overlaid one on another. Object data created in this way also corresponds to second object data generated based on first object data.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A non-transitory computer readable storage medium storing a set of program instructions executed by a computer included in an information processing device, the set of program instructions, when executed by the computer, causing the information processing device to perform:

preparing first label data including first object data, the first label data representing a first image, the first object data representing a first object in the first image, the first label data being to be used to create a first label by printing the first image on a first medium;

controlling a display to display an editing screen, the editing screen including an object image display area and an operation receiving area different from the object image display area, the object image display area being for displaying an object image representing both the first object and a second object in such a manner that the first object and the second object can be overwrapped with each other, the operation receiving area being for displaying a position adjuster in such a manner that the position adjuster is movable on the basis of an operation to the position adjuster, the position adjuster being moved by the operation and a distance between the first object and the second object in the object image being adjusted depending on a movement of the position adjuster based on the operation thereto; and generating second label data including second object data by using the first label data,
the second object data being generated by using the first object data,
the second label data representing a second image and the second object data representing the second object in the second image,
the second label data being to be used to create a second label by printing the second image on a second medium, the first label and the second label being to be overlaid one on another to create a composite label, and a region of the first object to be printed on the first medium and a region of the second object to be printed on the second medium being partially overlapped with each other while the first object is shifted from the second object by the distance adjusted on the basis of the operation to the position adjuster, in a state that the first label and the second label are overlaid one on another.

2. The non-transitory computer readable storage medium according to claim 1, wherein the editing screen further includes an operation button for receiving a prescribed operation to start the generating the second label data, wherein the set of program instructions, when executed by the computer, further causes the information processing device to perform:

receiving operation information indicating that the prescribed operation has been received via the operation button, wherein when the receiving the operation information has been executed, the generating the second label data is executed using the object image that is displayed on the editing screen.

3. The non-transitory computer readable storage medium according to claim 2, wherein the first label data further includes third object data, wherein on the basis of the operation information, the generating generates the second label data to include the second object data corresponding to the first object data and fourth object data corresponding to the third object data, the fourth object data representing a fourth object.

4. The non-transitory computer readable storage medium according to claim 3, wherein the first label and the second label are to be overlaid one on another to create the composite label representing a composite image in which the first image and the second image are overlapped with each other, wherein the second label data is generated so that in the composite image, a difference in position between the first object and the second object is equal to a difference in position between a third object and the fourth object.

5. The non-transitory computer readable storage medium according to claim 1, wherein the preparing prepares the first label data by acquiring the first label data from an external device, wherein the generating generates the second label data by using the acquired first label data in a case that composite information has been received when the first label data has been acquired, the composite information indicating that the first label data is to be used for creating the composite label.

6. The non-transitory computer readable storage medium according to claim 5, wherein the first label data further includes third object data, wherein on the basis of the composite information, the generating generates the second label data to include the second object data corresponding to the first object data and fourth object data corresponding to the third object data, the fourth object data representing a fourth object.

7. The non-transitory computer readable storage medium according to claim 6, wherein the first label and the second label are to be overlaid one on another to create the composite label representing a composite image in which the first image and the second image are overlapped with each other, wherein the second label data is generated so that in the composite image, a difference in position between the first object and the second object is equal to a difference in position between a third object and the fourth object.

8. The non-transitory computer readable storage medium according to claim 1, wherein the set of program instructions, when executed by the computer, further causes the information processing device to perform:

acquiring template data including first label template data including the first object data and second label template data including the second object data; and replacing, according to an instruction to change the first object data, the first object data in the first label template data with updated first object data so that the first label template data includes the updated first object data in place of the first object data, wherein the preparing generates the first label data on the basis of the first label template data including the updated first object data, wherein when the first object data has been replaced with the updated first object data in the first label template data, the generating generates the second label data by replacing, on the basis of the first label template data including the updated first object data, the second object data in the second label template data with updated second object data so that the second label template data includes the updated second object data in place of the second object data.

9. The non-transitory computer readable storage medium according to claim 1, wherein the set of program instructions, when executed by the computer, further causes the information processing device to perform:

instructing to print the first image on the first medium and the second image on the second medium.

10. The non-transitory computer readable storage medium according to claim 1, wherein the set of program instructions, when executed by the computer, further causes the information processing device to perform:

outputting a display signal to display the first image and the second image on the display, wherein the first object data specifies a first color of the first object and the second object data specifies a second color of the second object different from the first color.

11. The non-transitory computer readable storage medium according to claim 10, wherein the second color is an achromatic color.

12. The non-transitory computer readable storage medium according to claim 10, wherein the display signal is for displaying the first image and the second image overlapped with each other, thereby forming a composite image.

13. The non-transitory computer readable storage medium according to claim 12, wherein the set of program instructions, when executed by the computer, further causes the information processing device to perform:

grouping together the first object data and the second object data to be processed altogether.

14. The non-transitory computer readable storage medium according to claim 13, wherein the set of program instructions, when executed by the computer, further causes the information processing device to perform:

adjusting, after the first object data and the second object data are grouped, a difference in position between the first object and the second object in the composite image.

15. The non-transitory computer readable storage medium according to claim 1, wherein the first label data specifies a first length of the first label in a longitudinal direction and the second label data specifies a second length of the second label in the longitudinal direction equal to the first length.

16. The non-transitory computer readable storage medium according to claim 1,
wherein a shape of the second object at least partially matches a shape of the first object.

17. The non-transitory computer readable storage medium according to claim 1,
wherein the region of the first object to be printed on the first medium and the region of the second object to be printed on the second medium are partially overlapped with each other in a thickness direction of one of the first label and the second label when the first label and the second label are to be overlaid one on another in the thickness direction.

18. A non-transitory computer readable storage medium storing a set of program instructions executed by a computer included in an information processing device, the set of program instructions, when executed by the computer, causing the information processing device to perform:
preparing first label data including first object data, the first label data representing a first image and the first object data representing a first object in the first image, the first label data being to be used to create a first label by printing the first image on a first medium; and
generating second label data including second object data by using the first label data,
the second object data being generated by using the first object data,
the second label data representing a second image and the second object data representing a second object in the second image,
the second label data being to be used to create a second label by printing the second image on a second medium,
the first label and the second label being to be overlaid one on another to create a composite label representing a composite image in which the first image and the second image are overlapped with each other, and
in the composite image, the second object including a shifted region, and the shifted region including (a) a non-overlapping part of the shifted region, and (b) an overlapping part of the shifted region, and
the shifted region provided by shifting a region of the first object by a prescribed distance so that the shifted region is partially overlapped with the region of the first object, such that:
the non-overlapping part of the shifted region is a part of the shifted region not overlapped with the region of the first object in the composite image; and
the overlapping part of the shifted region is a further part of the shifted region overlapped with the region of the first object in the composite image.

19. The non-transitory computer readable storage medium according to claim 18, wherein the set of program instructions, when executed by the computer, further causes the information processing device to perform:
controlling a display to display an editing screen including the first image and an operation button for receiving a prescribed operation to start the generating the second label data; and
receiving operation information indicating that the prescribed operation has been received via the operation button,
wherein when the receiving the operation information has been executed, the generating the second label data is executed using the first image that is displayed on the editing screen.

20. The non-transitory computer readable storage medium according to claim 19,
wherein the first label data further includes third object data,
wherein on the basis of the operation information, the generating generates the second label data to include the second object data corresponding to the first object data and fourth object data corresponding to the third object data, the fourth object data representing a fourth object.

21. The non-transitory computer readable storage medium according to claim 20, wherein the first label and the second label are to be overlaid one on another to create the composite label representing the composite image in which the first image and the second image are overlapped with each other,
wherein the second label data is generated so that in the composite image, a difference in position between the first object and the second object is equal to a difference in position between a third object and the fourth object.

22. The non-transitory computer readable storage medium according to claim 18,
wherein the preparing prepares the first label data by acquiring the first label data from an external device,
wherein the generating generates the second label data by using the acquired first label data in a case that composite information has been received when the first label data has been acquired, the composite information indicating that the first label data is to be used for creating the composite label.

23. The non-transitory computer readable storage medium according to claim 22,
wherein the first label data further includes third object data,
wherein on the basis of the composite information, the generating generates the second label data to include the second object data corresponding to the first object data and fourth object data corresponding to the third object data, the fourth object data representing a fourth object.

24. The non-transitory computer readable storage medium according to claim 23, wherein the first label and the second label are to be overlaid one on another to create the composite label representing the composite image in which the first image and the second image are overlapped with each other,
wherein the second label data is generated so that in the composite image, a difference in position between the first object and the second object is equal to a difference in position between a third object and the fourth object.

25. The non-transitory computer readable storage medium according to claim 18, wherein the set of program instructions, when executed by the computer, further causes the information processing device to perform:

acquiring template data including first label template data including the first object data and second label template data including the second object data, and replacing, according to an instruction to change the first object data, the first object data in the first label template data with updated first object data so that the first label template data includes the updated first object data in place of the first object data, wherein the preparing generates the first label data on the basis of the first label template data including the updated first object data, wherein when the first object data has been replaced with the updated first object data in the first label template data, the generating generates the second label data by replacing, on the basis of the first label template data including the updated first object data, the second object data in the second label template data with updated second object data so that the second label template data includes the updated second object data in place of the second object data.

26. The non-transitory computer readable storage medium according to claim 18, wherein the set of program instructions, when executed by the computer, further causes the information processing device to perform:

instructing to print the first image on the first medium and the second image on the second medium.

27. The non-transitory computer readable storage medium according to claim 18, wherein the set of program instructions, when executed by the computer, further causes the information processing device to perform:

outputting a display signal to display the first image and the second image on a display, wherein the first object data specifies a first color of the first object and the second object data specifies a second color of the second object different from the first color.

28. The non-transitory computer readable storage medium according to claim 27, wherein the second color is an achromatic color.

29. The non-transitory computer readable storage medium according to claim 27, wherein the display signal is for displaying the first image and the second image overlapped with each other, thereby forming the composite image.

30. The non-transitory computer readable storage medium according to claim 29, wherein the set of program instructions, when executed by the computer, further causes the information processing device to perform:

grouping together the first object data and the second object data to be processed altogether.

31. The non-transitory computer readable storage medium according to claim 30, wherein the set of program instructions, when executed by the computer, further causes the information processing device to perform:

adjusting, after the first object data and the second object data are grouped, a difference in position between the first object and the second object in the composite image.

32. The non-transitory computer readable storage medium according to claim 18, wherein the first label data specifies a first length of the first label in a longitudinal direction and the second label data specifies a second length of the second label in the longitudinal direction equal to the first length.

33. The non-transitory computer readable storage medium according to claim 18, wherein a shape of the second object at least partially matches a shape of the first object.

34. An information processing device comprising:
a computer configured to perform:

preparing first label data including first object data, the first label data representing a first image, the first object data representing a first object in the first image, the first label data being to be used to create a first label by printing the first image on a first medium;

controlling a display to display an editing screen, the editing screen including an object image display area and an operation receiving area different from the object display area, the object image display area being for displaying an object image representing both the first object and a second object in such a manner that the first object and the second object can be overwrapped with each other, the operation receiving area being for displaying a position adjuster in such a manner that the position adjuster is movable on the basis of an operation to the position adjuster, the position adjuster being moved by the operation and a distance between the first object and the second object in the object image being adjusted depending on a movement of the position adjuster based on the operation thereto; and generating second label data including second object data by using the first label data, the second object data being generated by using the first object data, the second label data representing a second image and the second object data representing the second object in the second image, the second label data being to be used to create a second label by printing the second image on a second medium, the first label and the second label being to be overlaid one on another to create a composite label, and a region of the first object to be printed on the first medium and a region of the second object to be printed on the second medium being partially overlapped with each other while the first object is shifted from the second object by the distance adjusted on the basis of the operation to the position adjuster, in a state that the first label and the second label are overlaid one on another.

35. The information processing device according to claim 34, wherein a shape of the second object at least partially matches a shape of the first object.

36. The information processing device according to claim 34, wherein the region of the first object to be printed on the first medium and the region of the second object to be printed on the second medium are partially overlapped with each other in a thickness direction of one of the first label and the second label when the first label and the second label are to be overlaid one on another in the thickness direction.

37. An information processing device comprising:
a computer configured to perform:

preparing first label data including first object data, the first label data representing a first image and the first object data representing a first object in the first image, the first label data being to be used to create a first label by printing the first image on a first medium; and generating second label data including second object data by using the first label data, the second object data being generated by using the first object data, the second label data representing a second image and the second object data representing a second object in the second image, the second label data being to be used to create a second label by printing the second image on a second medium, the first label and the second label being to be overlaid one on another to create a composite label representing a composite image in which the first image and the second image are overlapped with each other, and in the composite image, the second object including a shifted region, and the shifted region including (a) a non-overlapping part of the shifted region, and (b) an overlapping part of the shifted region, and the shifted region provided by shifting a region of the first object by a prescribed distance so that the shifted region is partially overlapped with the region of the first object, such that:

the non-overlapping part of the shifted region being a part of the shifted region not overlapped with the region of the first object in the composite image; and the overlapping part of the shifted region being a further part of the shifted region overlapped with the region of the first object in the composite image.

38. The information processing device according to claim 37, wherein a shape of the second object at least partially matches a shape of the first object.

* * * * *